United States Patent [19]

Hung et al.

[11] Patent Number: 5,065,234

[45] Date of Patent: Nov. 12, 1991

[54] METHOD AND APPARATUS FOR CORRECTING THE COLOR OF A PRINTED IMAGE

[75] Inventors: Po-Chieh Hung; Tatsuya Kaneniwa, both of Tokyo, Japan

[73] Assignee: Konica Corporation, Tokyo, Japan

[21] Appl. No.: 533,809

[22] Filed: Jun. 6, 1990

Related U.S. Application Data

[63] Continuation of Ser. No. 137,885, Dec. 24, 1987, Pat. No. 4,939,711.

[30] Foreign Application Priority Data

| Apr. 10, 1987 | [JP] | Japan | 62-89004 |
| Apr. 10, 1987 | [JP] | Japan | 62-89005 |
| Apr. 10, 1987 | [JP] | Japan | 62-89006 |
| Apr. 10, 1987 | [JP] | Japan | 62-89007 |
| Apr. 10, 1987 | [JP] | Japan | 89008 |
| Apr. 10, 1987 | [JP] | Japan | 62-89009 |
| Jul. 8, 1987 | [JP] | Japan | 62-170357 |
| Dec. 25, 1987 | [JP] | Japan | 61-314636 |

[51] Int. Cl.$^5$ .................................................. H04N 1/46
[52] U.S. Cl. .......................................... 358/80; 358/78
[58] Field of Search ............................... 358/75, 78, 80

[56] References Cited

U.S. PATENT DOCUMENTS

| 2,434,561 | 1/1948 | Hardy et al. . |
| 3,612,753 | 10/1971 | Korman . |
| 3,893,166 | 7/1975 | Pugsley . |
| 4,037,249 | 7/1977 | Pugsley . |
| 4,058,828 | 11/1977 | Ladd . |
| 4,481,532 | 11/1984 | Clark et al. . |
| 4,561,016 | 12/1985 | Jung et al. . |
| 4,626,903 | 12/1986 | Giesche et al. . |
| 4,670,780 | 6/1987 | McManus et al. . |
| 4,675,704 | 6/1987 | Yamamoto . |
| 4,731,662 | 3/1988 | Udagawa et al. . |
| 4,752,822 | 6/1988 | Kawamura . |
| 4,758,885 | 7/1988 | Sasaki et al. . |

FOREIGN PATENT DOCUMENTS

| 0144188 | 12/1985 | European Pat. Off. . |
| 0173032 | 3/1986 | European Pat. Off. . |
| 60-220659 | 11/1985 | Japan . |
| 61-7774 | 1/1986 | Japan . |
| 61-10362 | 1/1986 | Japan . |
| 61-50153 | 3/1986 | Japan . |
| 62-296669 | 12/1987 | Japan . |
| 1369702 | 10/1974 | United Kingdom . |

OTHER PUBLICATIONS

Milton Pearson et al., "Design of a Printed Spectrum Using Modified Neugebaur Halftone Equations", Journal of the Optical Society of American, vol. 65, No. 3, Mar. 1975, pp. 323–326.

M. C. Stone et al., "A Description of the Color Reproduction Methods Used for this Issue of Color Research and Application," pp. s83–s88.

Primary Examiner—James J. Groody
Assistant Examiner—Mark R. Powell
Attorney, Agent, or Firm—Finnegan, Henderson, Farabow, Garrett and Dunner

[57] ABSTRACT

A color correction apparatus including a memory for storing a plurality of combinations of basic colors, each of the combinations of basic colors being obtained by combining a plurality of basic colors. Weighting information storage is provided for storing predetermined mixing ratios of the plurality of basic colors for intermediate colors to be obtained. A calculator is provided for calculating color image data corresponding to the input color image data by processing the combination of basic colors in relation to the mixing ratios.

2 Claims, 24 Drawing Sheets

FIG. 13
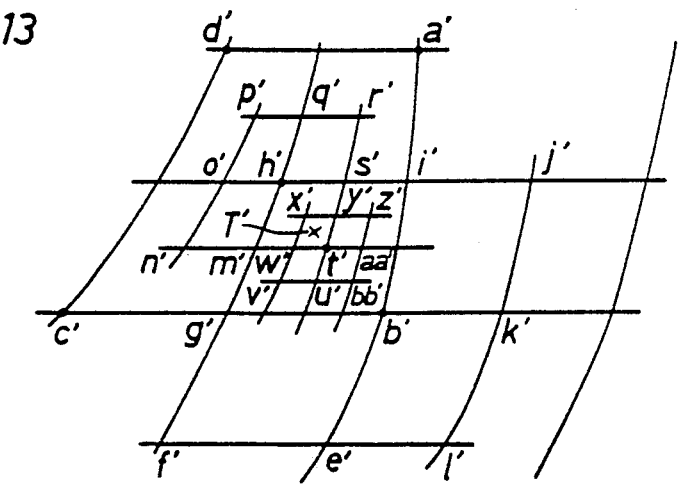
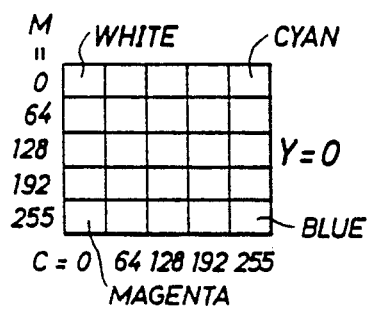
FIG.14A
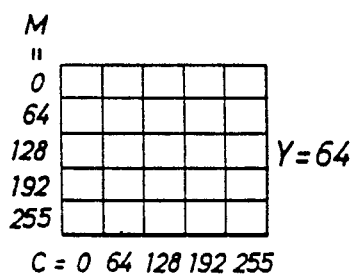
FIG.14B
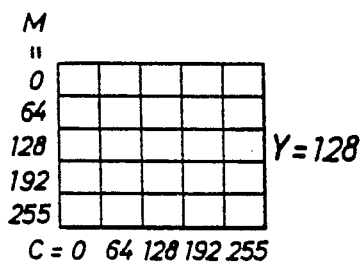
FIG.14C
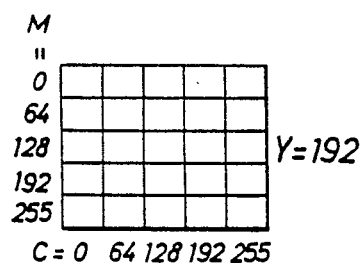
FIG.14D
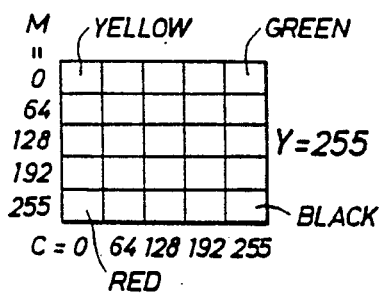
FIG.14E

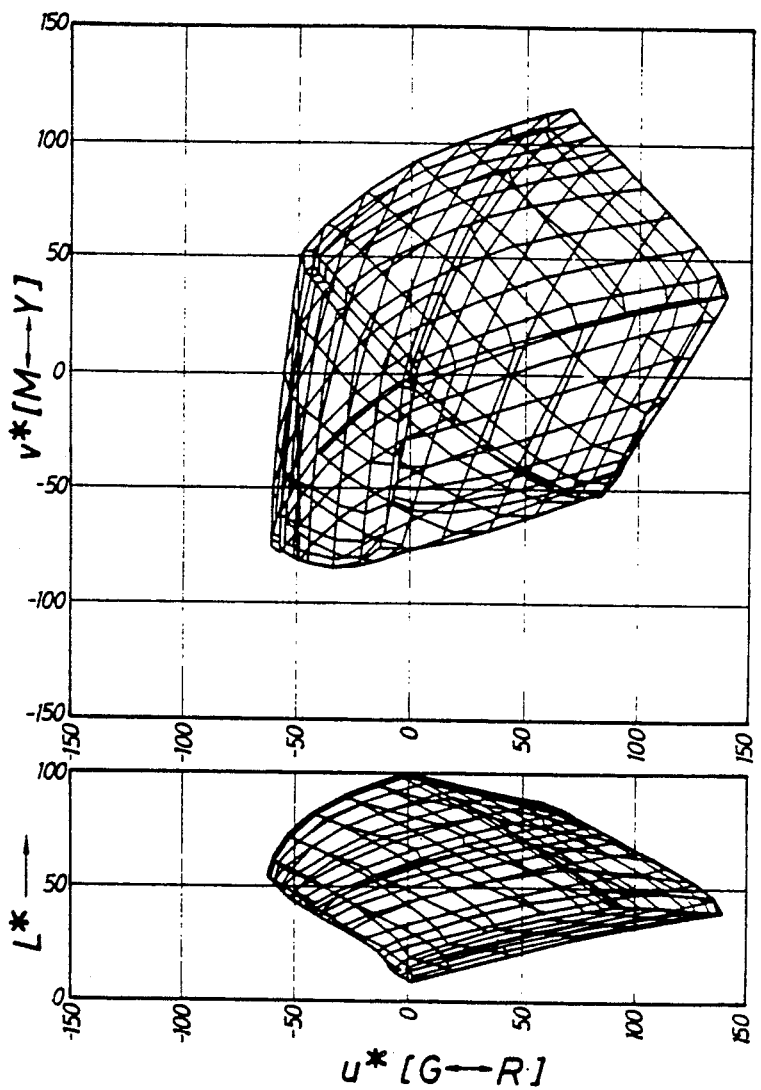
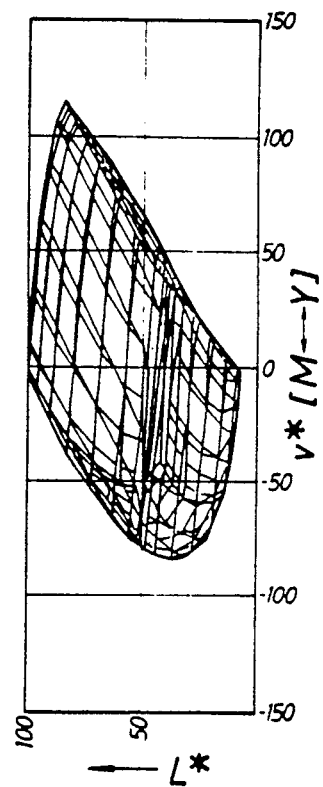
FIG. 18A
FIG. 18B
FIG. 18C

FIG. 20
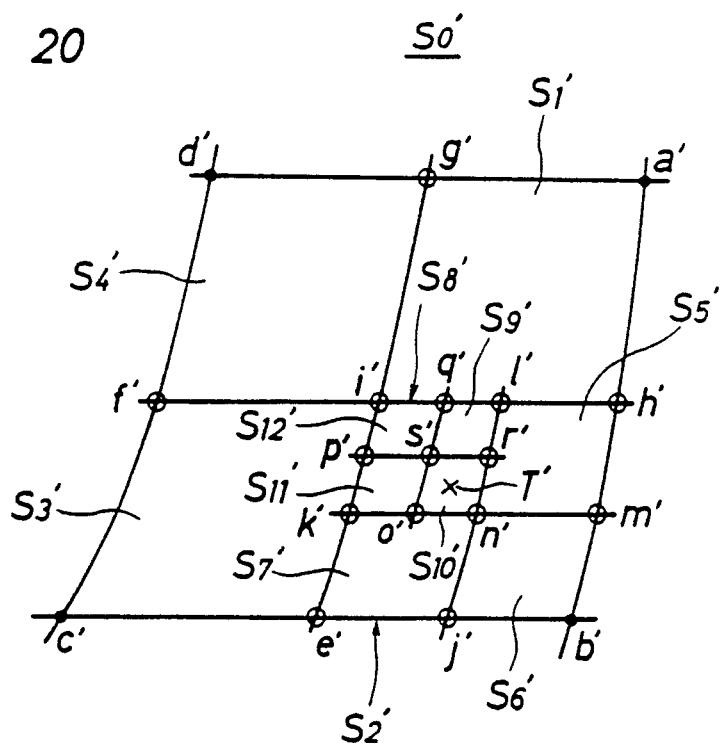
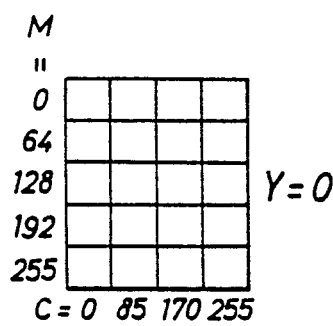
FIG. 21A
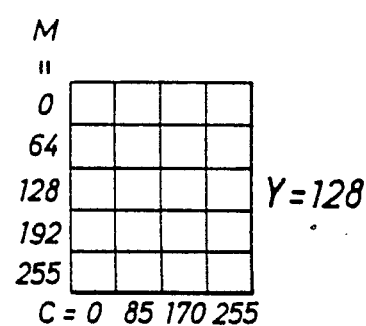
FIG. 21B
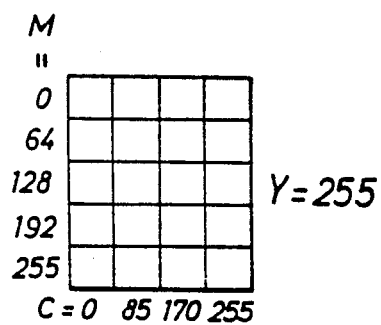
FIG. 21C

FIG. 28
| No.(ADDRESS) | 0 | 1 | 2 | 3 | ...... | 12 | 13 | ...... | 30 | 31 |
|---|---|---|---|---|---|---|---|---|---|---|
| COLOR CORRECTION DATA | 0 | 8 | 16 | 24 | ...... | 96 | 104 | ...... | 240 | 248 |
FIG. 29
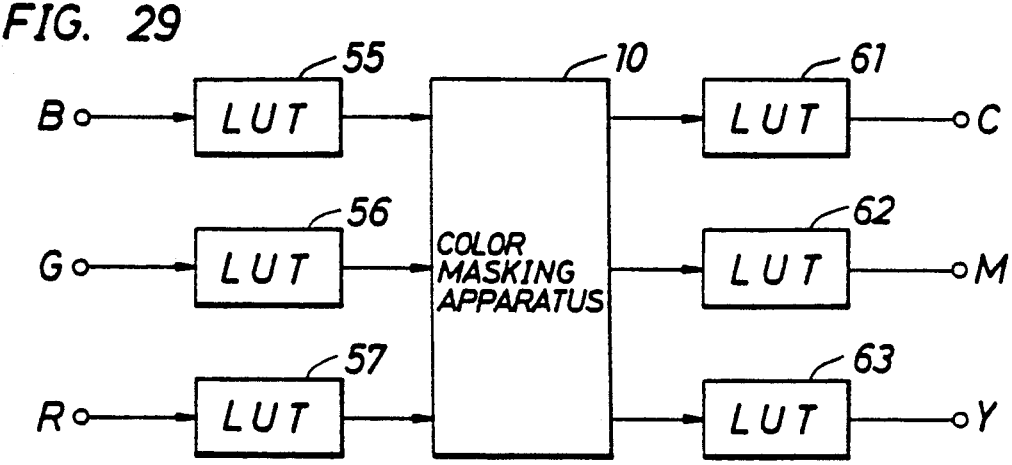
FIG. 30
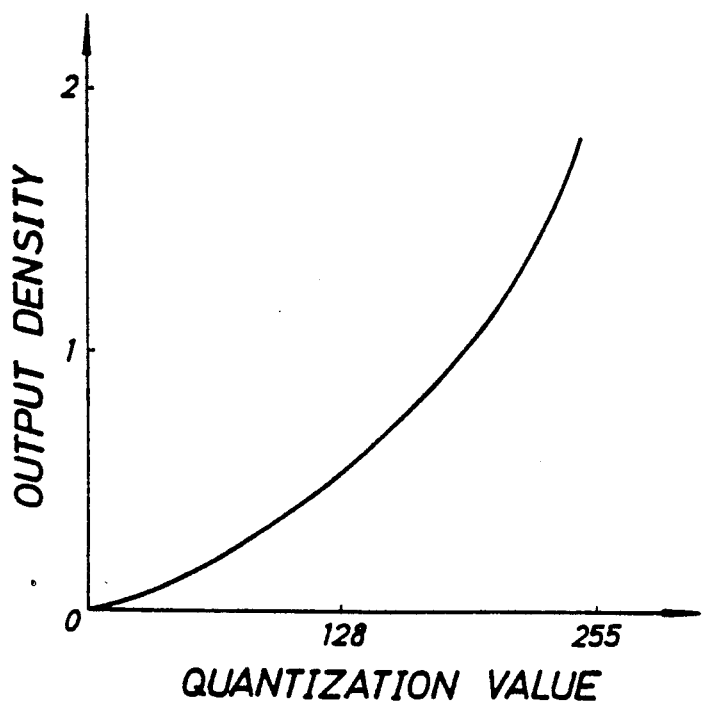

FIG. 31

| No.(ADDRESS) | 0 | 1 | 2 | 3 | ... | 12 | 13 | 14 | ... | 21 | 22 | 23 | 24 | 25 | 26 | 27 | 28 | 29 | 30 | 31 |
|---|---|---|---|---|---|---|---|---|---|---|---|---|---|---|---|---|---|---|---|---|
| MATRIX POINT (COLOR CORRECTION DATA) | 0 | 8 | 16 | 24 | ... | 96 | 104 | 112 | ... | 168 | 176 | 184 | 201 | 210 | 219 | 228 | 237 | 246 | 255 | |
| IDENTIFICATION SIGNAL | 0 | 0 | 0 | 0 | ... | 0 | 0 | 0 | ... | 0 | 0 | 0 | 1 | 1 | 1 | 1 | 1 | 1 | 1 | 1 |

8-BIT INTERVAL (columns 0–23), 9-BIT INTERVAL (columns 24–31)

FIG. 32

| SELECTION SIGNAL | | | ADDRESS SIGNAL TO 24 | | | ADDRESS SIGNAL TO 20 | | | 8/9-BIT IDENTIFICATION SIGNAL | | | WEIGHTING COEFFICIENT (THEORETICAL VALUE) | WEIGHTING COEFFICIENT (ACTUAL VALUE) |
|---|---|---|---|---|---|---|---|---|---|---|---|---|---|
| 0 | 0 | 0 | 0 | 7 | 6 | 8 | 17 | 26 | 0 | 0 | 1 | 24 | 11 |
| 0 | 0 | 1 | 0 | 7 | 3 | 8 | 17 | 27 | 0 | 0 | 1 | 48 | 21 |
| 0 | 1 | 0 | 0 | 1 | 6 | 8 | 18 | 26 | 0 | 0 | 1 | 168 | 75 |
| 0 | 1 | 1 | 0 | 1 | 3 | 8 | 18 | 27 | 0 | 0 | 1 | 336 | 149 |
| 1 | 0 | 0 | 8 | 7 | 6 | 9 | 17 | 26 | 0 | 0 | 1 | 0 | 0 |
| 1 | 0 | 1 | 8 | 7 | 3 | 9 | 17 | 27 | 0 | 0 | 1 | 0 | 0 |
| 1 | 1 | 0 | 8 | 1 | 6 | 9 | 18 | 26 | 0 | 0 | 1 | 0 | 0 |
| 1 | 1 | 1 | 8 | 1 | 3 | 9 | 18 | 27 | 0 | 0 | 1 | 0 | 0 |
| | | | | | | | | | | | | (=576) | (=256) |

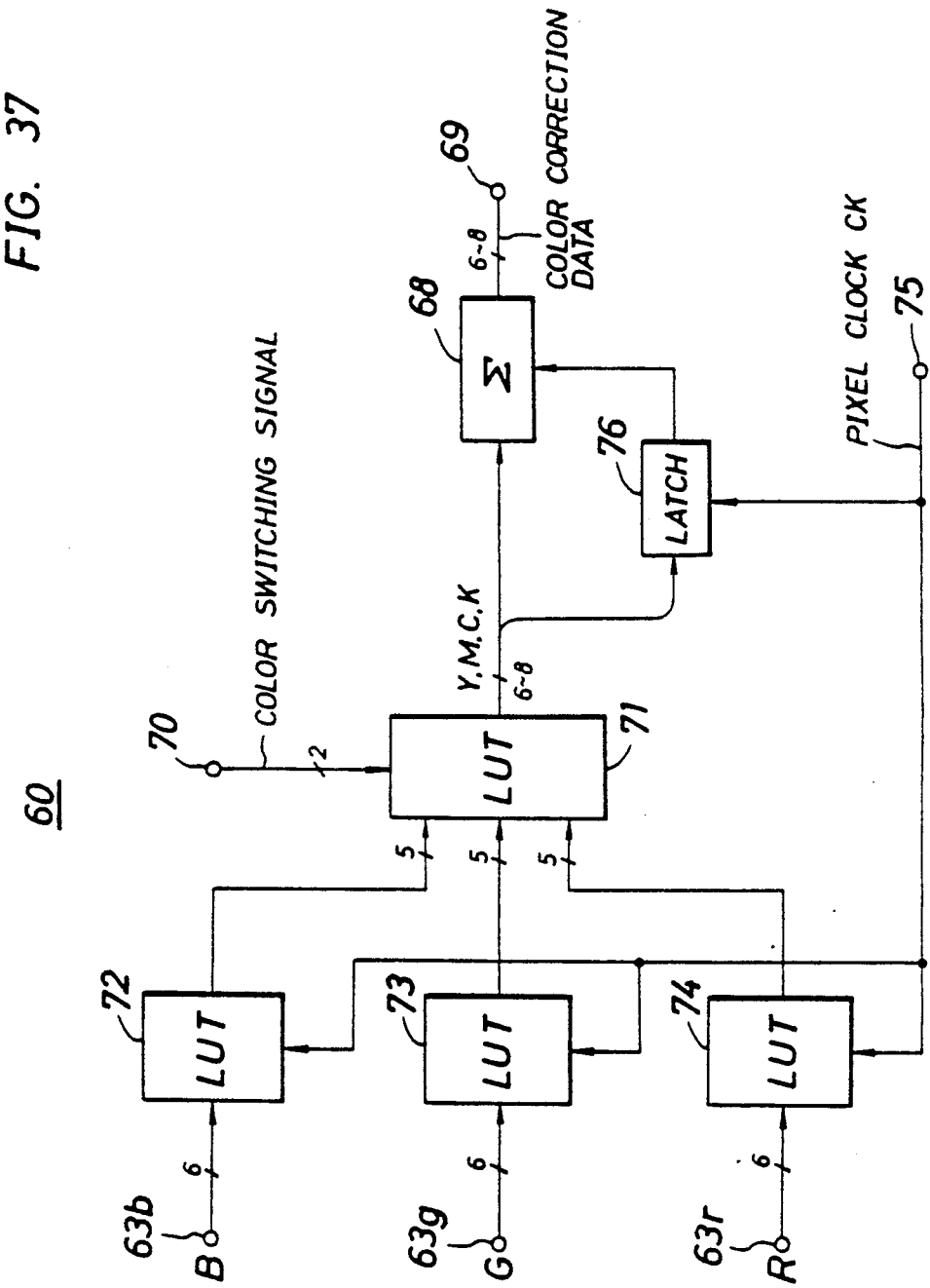

METHOD AND APPARATUS FOR CORRECTING THE COLOR OF A PRINTED IMAGE

BACKGROUND OF THE INVENTION

1. Field of the Invention

The present invention relates to a method of correcting a color image, the method being suitable for color correction (color proof) in a video printer, a digital color copying machine, or the like, and an apparatus for practicing the above method.

2. Description of the Prior Art

In order to obtain a hard copy of a television image signal by using a video printer, a digital color copying machine, or the like, a color image correction apparatus is often used to perform color correction so as to match the colors of the original image signal with the reproduced colors.

In a conventional color masking apparatus as a typical color image correction apparatus, a secondary absorbing component of a color material (e.g., a toner, an ink, a thermal transfer ink, and print paper) is canceled to reproduce accurate colors (intermediate colors).

In a television image, a color image is formed according to the additive primaries and the colors are represented according to a coordinate system of R, G, and B phosphors. However, a color image formed on print paper is reproduced according to the subtractive primaries. The colors are represented by a color system of $L^*$, $u^*$ and $v^*$. Therefore, signal data conversion (color correction) must be performed between these different color systems.

For example, in a color masking apparatus 1 shown in FIG. 1, R, G, and B color image data are arithmetically calculated to obtain new image data (the color-corrected image data, i.e., cyan (C), magenta (M), and yellow (Y) data). A color image is recorded on the basis of the new color data C, M, and Y.

Referring to FIG. 1, reference numeral 2 denotes a television receiver; 3, a color printer, and 4, a recording medium such as print paper.

A masking method used in such a color masking apparatus 1 is a linear masking method or a nonlinear masking method.

Linear masking employs a calculation represented by equation (1) and nonlinear masking employs a calculation represented by equation (2) as follows:

$$\begin{pmatrix} C \\ M \\ Y \end{pmatrix} = (A) \begin{pmatrix} B \\ G \\ R \end{pmatrix} \quad (1)$$

$$\begin{pmatrix} C \\ M \\ Y \end{pmatrix} = (D) \begin{pmatrix} B \\ G \\ R \\ B^2 \\ G^2 \\ R^2 \\ BG \\ GR \\ \vdots \end{pmatrix} \quad (2)$$

where A and D are coefficient matrices.

Linear masking is performed using a $3 \times 3$ matrix represented by equation (1). In order to realize this calculation, a multiplier is used to perform calculations step by step, or calculation results are formatted into a table (look-up table (LUT)) and color correction data is read out from the look-up table.

Nonlinear masking can be performed by using a logic array or the LUT described above.

The correction values obtained by the above-mentioned linear calculations are approximated values according to polynomial approximation, and the resultant color correction data is also inaccurate. In particular, in order to derive a coefficient A, key color matching is performed. This matching is relatively good for key colors but is not suitable for other colors, i.e., colors excluded from the key colors. As a result, the hue, the saturation, and the lightness are deviated from the correct values in the colors excluded from the key colors.

In particular, when image information from a television monitor is to be reproduced as a hard copy, large color reproduction errors occur even if key color matching is performed because the image signal from the television monitor is based on the additive primaries while the hard copy formed on the print paper is based on the subtractive primaries and color reproduction ranges between these color reproduction systems are different from each other.

When color correction data is obtained by nonlinear processing, the hue, saturation, and lightness errors of the colors excluded from the key colors are minimized, and good color reproducibility can be achieved.

However, in color correction according to nonlinear processing, complicated hardware is required. When an LUT or the like is used, a large memory capacity is undesirably required.

Assume that C, M, or Y image data is represented by 8-bit data. All combinations of these data are calculated as $2^8 \cdot 2^8 \cdot 2^8 = 2^{24}$. In order to obtain three color correction data, the required memory capacity is:

$2^{24} \times 3 = 50.3$ Mbytes

Japanese Unexamined Patent Publication (Kokai) No. 61-60068 discloses one means for solving the hardware problem and reducing the memory capacity.

An arrangement of this means is shown in FIG. 2. Input image data is divided into upper and lower bits. The upper and lower bit data are respectively supplied to corresponding LUT 11 and LUT 12 as reference address data. The upper bit LUT 11 stores a plurality of color correction data calculated in advance at proper intervals and serving as color correction data accessed by the upper bits of the input image data. The lower bit LUT 12 stores color correction data corresponding to a single correction curve.

The image data accessed by the upper bits of the input image data and the color correction data accessed by the lower bits of the input image data are added by an adder 13, thereby obtaining updated color correction data.

When the input image data is divided into the upper and lower bits and the upper and lower bits are subjected to processing, the required memory capacity can be greatly reduced as compared with the conventional memory.

However, the above means has the following disadvantage.

If output image data corresponding to the input image data is represented by a curve $L_1$ shown in FIG.

3A and linear approximation color correction data (mark ○) represented by a straight line $L_2$ is used, an output error tends to be increased when the magnitude of the input value is increased.

If nonlinear approximation color correction data (mark ○) having the same gradient as the input image data and represented by a curve $L_3$ shown in FIG. 3B is used, the characteristic line (or curve) of the color correction data stored in the lower bit LUT 12 has a predetermined gradient (shape). Therefore, the data (output value) after color correction is represented by a curve $L_4$.

Whether or not a portion of the input image data has a small or large gradient, the color correction data has a discrete portion and continuous color correction cannot be performed.

In a conventional color masking apparatus, a combination of basic colors (three or four colors) for reproducing a designated hue is obtained by accurately obtaining the hue characteristics of a color printer or the like. Therefore, the color conversion errors can be minimized and color reproduction characteristics can be greatly improved.

There are two conventional methods as a method of calculating a combination of basic colors (three or four colors) for reproducing a designated hue.

First, a density additive method is used. In order to form a hardcopy on print paper, spectral absorption densities of single colors (Y, M, and C) are measured, and total absorption characteristics are calculated using the measured densities according to the density additive method. The calculated total absorption characteristics are then converted into X, Y, and Z values, or $L^*$, $u^*$, and $v^*$ values in a color system. The density additive method is defined as a method of adding densities of the respective colors in spectral densities.

FIG. 4 is a graph showing special absorption density characteristics of colors. The special density versus wavelength is shown for two colors Y and M in solid line and solid/dashed line, respectively. The addend of the spectral density is shown in dashed line and designated Y and M;

Second, a Neugebauer equation is used to estimate a combination of the basic colors in printing.

The density additive method is not practiced in an actual system when print paper is used because it has poor precision of color reproducibility estimation.

Even if the Neugebauer equation is used, this produces an approximation and a difference between the approximated value and the actual value is large. Precision of color reproducibility is poor.

In order to solve the problem associated with precision of such color reproducibility, a method may be proposed to record a color image of a television image signal directly on a recording medium such as print paper, measuring the colors of the recorded image, and calculating the correction values.

In this case, measurement is preferably performed on the basis of color patch images, i.e., a plurality of color images obtained by combining a plurality of basic colors because the measured color points can be clearly specified.

However, the as number of color patches is indefinitely increased, the color measurement points are increased accordingly. The increase in color measurement points undesirably prolongs the color measurement time. The above solution is not the best solution.

If a color reproduction range of an output system such as print paper and a color reproduction range of an input system such as a color CRT are expressed by a single color system of $L^*$, $u^*$, and $v^*$, the two color reproduction ranges differ from each other. More specifically, the color reproduction range of the output color system is narrower than that of the input color system.

FIG. 5 shows a relationship between a desired printed product and a practical print paper. The color reproduction range of the printed product is represented by a curve $L_1$, and that of the print paper is represented by a curve $L_2$.

If the lightness and saturation levels in the input color reproduction range are high and these levels are not included in the color reproduction range of the output system (region *1 in FIG. 5), the input colors cannot be expressed.

If color image information having a level exceeding the color reproduction range of the output color system is input, a corresponding value does not exist in the output color system. According to a conventional technique, color correction data associated with the color image information having a level exceeding the color reproduction range of the output color system is arbitrarily compressed within the color reproduction range. Therefore, the hue, the saturation and the lightness are changed in a direction different from that of the human visual sense. The output colors become unnatural.

SUMMARY OF THE INVENTION

It is a first object of the present invention to provide a method of correcting a color image and an apparatus therefor, which are suitably applied to a color masking apparatus, free from color correction errors and color correction omissions or discontinuity, and can greatly decrease the capacity (needed size) of a data table for color correction data.

In order to solve the above problems, according to the present invention, there is provided a method of correcting a color image, comprising the steps of dividing a color space constituted by three color image data subjected to color correction into a plurality of space regions, selecting a plurality of color correction data located at vertices of the space regions including combinations of the input color separation data by using a color correction data table for storing color correction data for combinations of the color image data located at the vertices, and obtaining color image data corrected by a plurality of selected color correction data.

According to the present invention, there is provided an apparatus for correcting a color image, comprising color correction data storing means for dividing a color space constituted by three color image data subjected to color correction into a plurality of space regions and for storing color correction data corresponding to combinations of three color image data located at vertices of the plurality of space regions, weighting data output means for outputting weighting data for the plurality of color correction data selected by the color correction data storing means, and processing means for outputting corrected color image data on the basis of the plurality of color correction data selected by the color correction data storing means on the basis of the input color image data and of the weighting data.

It is a second object of the present invention to provide a method of correcting a color image and an apparatus therefor, which are suitably used in a color masking apparatus and are free from color correction errors and can greatly improve color reproducibility.

In order to achieve the the second object, there is provided a method of correcting color separation data, comprising the steps of outputting a plurality of combinations of reproduction colors beforehand on the basis of a plurality of combinations of basic colors, calculating color system values corresponding to the combinations, interpolating and calculating the color system values, and obtaining combinations of the basic colors on the basis of the color system values to be calculated.

According to the present invention, there is provided an apparatus for correcting a color image, comprising a memory for outputting a plurality of combinations of reproduction colors beforehand on the basis of a plurality of combinations of basic colors, calculating color system values corresponding to the combinations, interpolating and calculating the color system values, and obtaining combinations of the basic colors on the basis of the color system values to be calculated, wherein the color correction data stored in the memory is read out in response to input color image data, thereby obtaining corrected color image data corresponding to the input color image data.

It is a third object of the present invention to provide a method of forming a color patch suitably applied when a color image is actually formed and error values between different color systems can be calculated.

In order to solve the above problems, there is provided an apparatus for reproducing a color image by mixing a plurality of basic colors on the basis of a color image signal input as an electrical signal and reproducing the color image on a recording medium, wherein a plurality of colors by different combinations of color image signals are reproduced as color patch images on the recording medium.

It is a fourth object of the present invention to provide a method of correcting a color image, wherein color correction errors can be minimized and natural colors can be reproduced even when color image data having a level exceeding a color reproduction range of an output color system is input.

According to this color image correction method, when the color reproduction range of the output system is narrower than that of the input system and color image data having a level exceeding the color reproduction range of the output system is input to a color image correction apparatus, output system values corresponding to the color image data are compressed in a monochromatic direction of the output color system, and the compressed values are corrected by the output display system values, thereby using the corrected compressed values.

It is a fifth object of the present invention to provide a method of correcting a color image, wherein color correction errors can be minimized, color reproducibility can be greatly improved, and an apparent color reproduction range of the output color system is expanded, thereby improving color reproducibility.

According to this color image correction method, whether the expression ranges of saturation and lightness of the input image are wider than those of the output system, the white level of the output system is set to be lower than the original white level.

This is because men perceive contrast of an object with respect to ambient brightness.

For example, yellow paper placed in the black background as shown in FIG. 6B is clearly recognized as compared with yellow paper placed in the white background as shown in FIG. 6A. This is because men can perceive relative contrast of yellow paper with respect to the background.

Therefore, when the expression ranges of saturation and lightness of the input system are wider than those of the output system, the white level of the output system is set to be lower than the original white level.

According to the sensitivity for relative contrast of colored objects, the image can be clearly recognized when the reference white level inherent to the image medium is lowered.

This technique is applied to a color image correction process for correcting a difference between the color systems. The color image can be corrected in the following steps:

First, a plurality of samples having hue levels similar to that of an intermediate color of interest (first step) are obtained;

Second, a correspondence between a mixing ratio of basic colors of each of the samples and the color system values is checked (second step); and Third, it is determined whether a target value T' is present outside the color reproduction range of the output color system (third step).

By these three steps, the mixing ratio of the basic colors for reproducing the intermediate color is calculated.

The samples in the first step are obtained as follows.

Signals of n discrete points (a total of n.n.n points) associated with the basic colors represented in a specific display system such as an Y-M-C coordinate system are processed to obtain $n^m$ color patch images as a color print on the print paper.

In the second step, the colors of the plurality of color patch images formed as a color print are actually measured, and the measured data are plotted on the color system (e.g., L*-u*-v* color system; this may apply to the following description) of the print paper. Therefore, the color values of the Y-M-C coordinate system can correspond to those of the L*-u*-v* color system, and the resultant values serve as the sample values.

In order to convert the measured data into values of the specific color system, specific conversion equations associated with the color system are used. Values obtained by changing brightness of the reference white level are used as brightness values of the reference white level in the conversion equations.

In the third step, the sample values are sequentially interpolated and converged to obtain sample values representing a color which is closest to the intermediate color. A one-to-one correspondence is established between the converged sample values and the mixing contents (color data Y, M, and C) of the basic colors.

A plurality of mixing ratios are prepared as color correction data and are looked up in response to the input color data.

In the color image correction apparatus, these color correction data are formatted as a table and the color correction data are looked up in response to the input color image data.

A color image is recorded on the basis of the corrected color image data.

If a means for changing the apparent color reproduction range is applied, a color having high lightness and saturation levels and sent from, e.g., a color CRT, which cannot be expressed in the conventional apparatus, can be printed on print paper.

Yellow having high lightness and saturation levels of a printed product can be formed on print paper or displayed on a color CRT.

It is a sixth object of the present invention to provide a method of estimating color by a color patches, wherein the apparent number of color patches is increased without increasing the actual number of color patches subjected to color measurement.

According to the present invention, in order to estimate an intermediate color in a given color system which is obtained by mixing a plurality of basic colors constituting a color image, a plurality of color patches are formed by combinations of the basic colors. Colors by combinations of basic colors which are excluded from these color patches are estimated by using the colors of at least three known color patches.

BRIEF DESCRIPTION OF THE DRAWINGS

FIGS. 12 and 13 are views for explaining interpolation;

FIGS. 14 and 21A to 21C show different color patch patterns;

FIGS. 18A to 18C are views for explaining a color system obtained by expansion of the sample points;

FIGS. 19 and 20 are views for explaining interpolation;

FIG. 28 is a view showing layout of matrix points;

FIG. 29 is a block diagram showing another embodiment of a color image correction apparatus according to the present invention;

FIG. 30 is a view showing a characteristic curve;

FIGS. 31 and 32 are views showing the relationship between a selection signal, color correction data, an identification signal, and the like;

FIG. 37 is a block diagram showing the main part of still another embodiment of a color image correction apparatus according to the present invention.

DETAILED DESCRIPTION OF THE PREFERRED EMBODIMENTS

A method of correcting a color image and an apparatus therefor will be described in detail with reference to FIG. 7.

Figure 1:
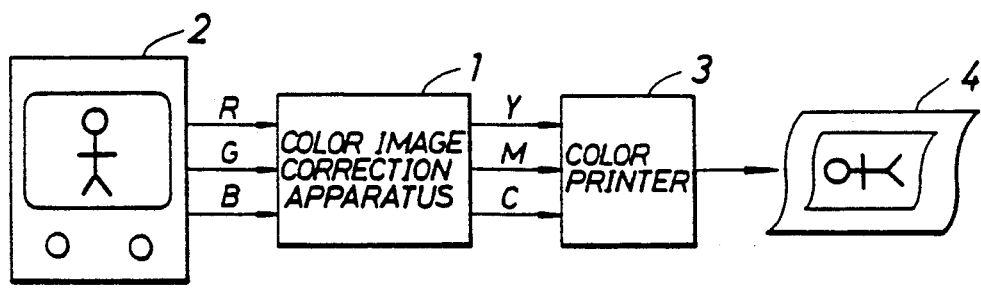
FIG. 1 is a block diagram of a conventional color image correction apparatus.
Figure 2:
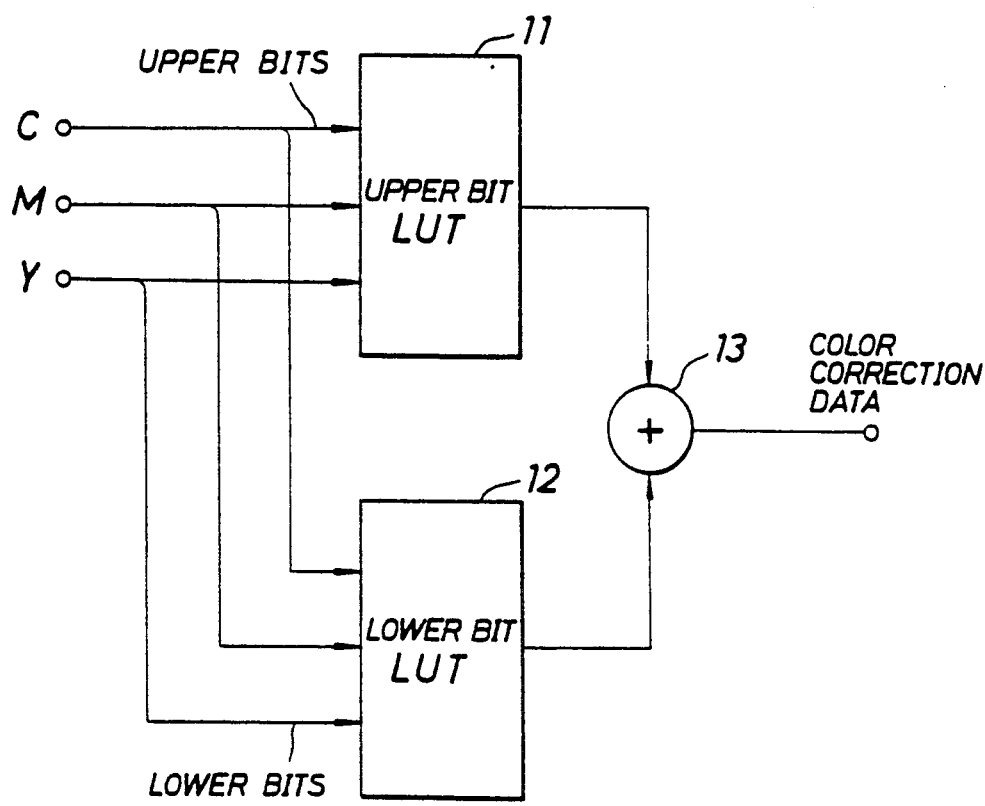
FIG. 2 is a block diagram of a conventional color masking apparatus.
Figure 3A:
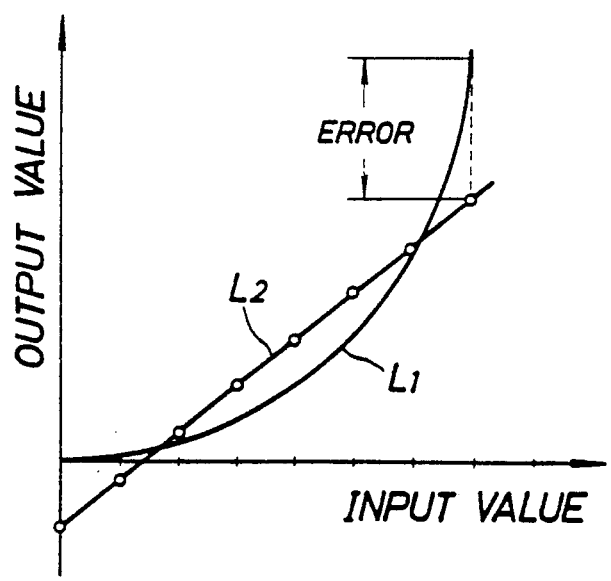
FIG. 3A is a view for explaining a conventional method of approximating color correction data.
Figure 3B:
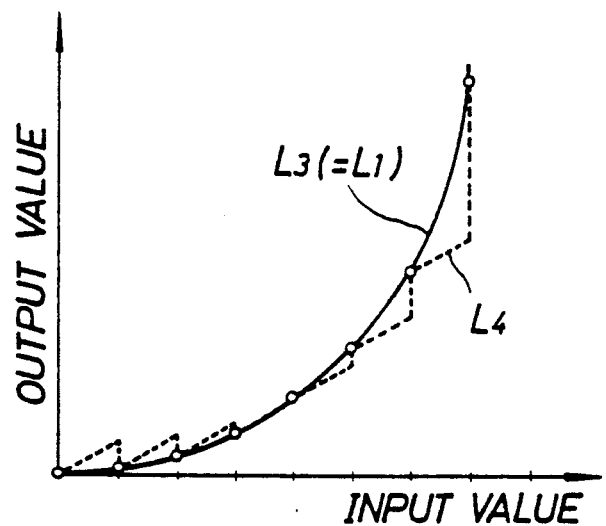
FIG. 3B is a view for explaining another conventional method of approximating color correction data.
Figure 4:
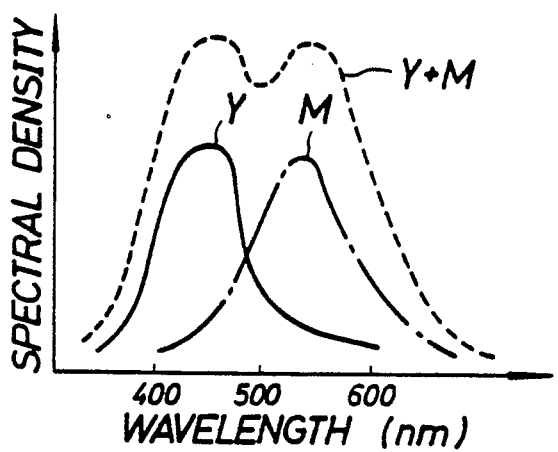
FIG. 4 is a view showing spectral absorption density characteristics of colors.
Figure 5:
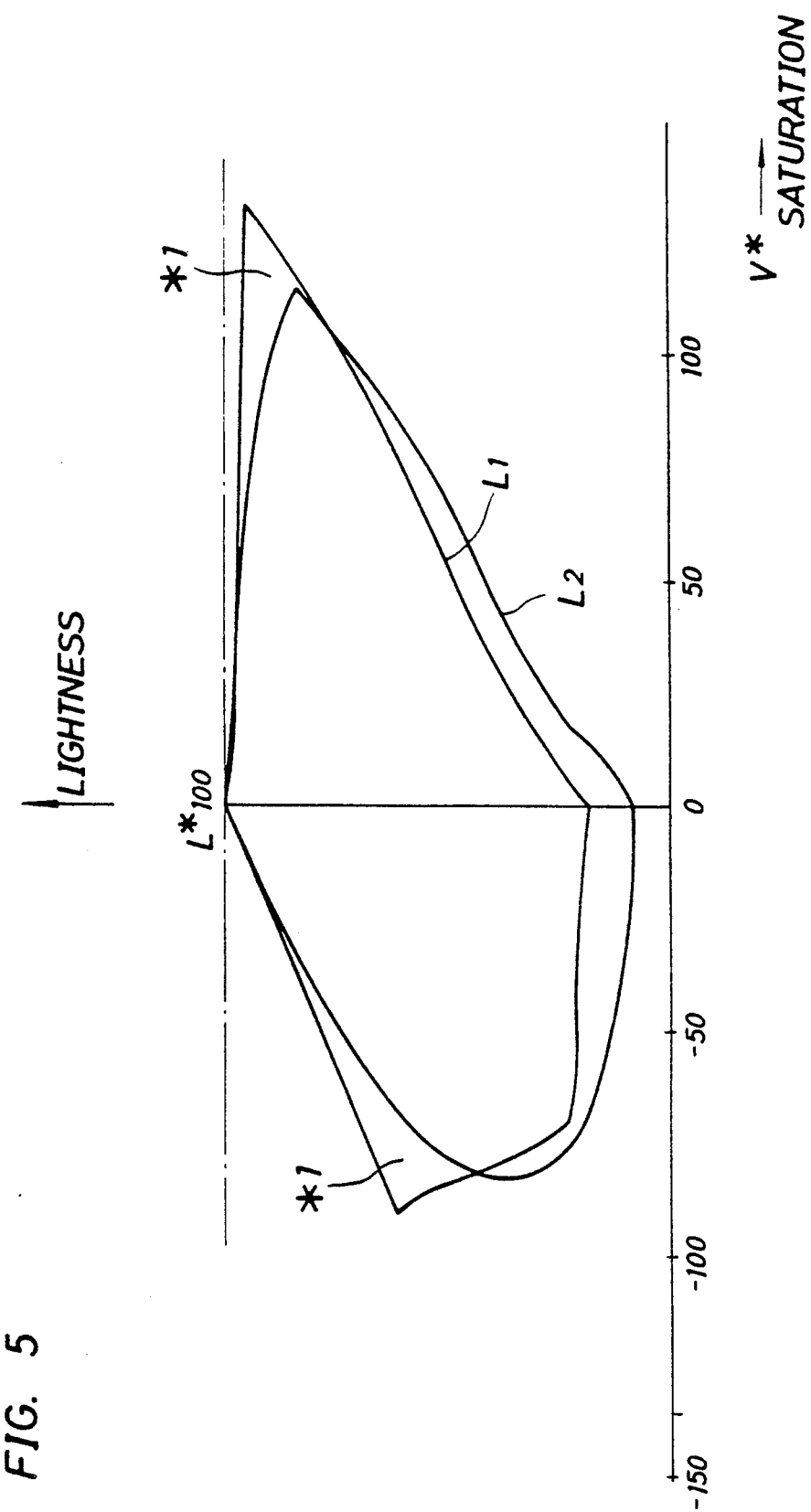
FIG. 5 is a view showing color reproduction ranges of a printed product and print paper.
Figure 6A:
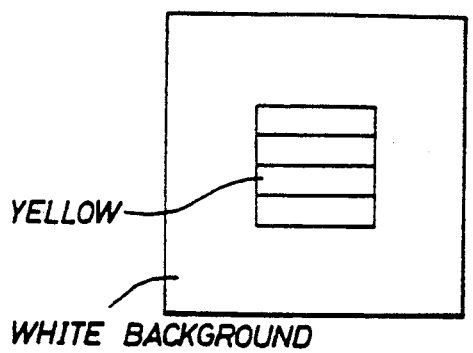
FIGS. 6A and 6B are views for explaining response of an eye.
Figure 6B:
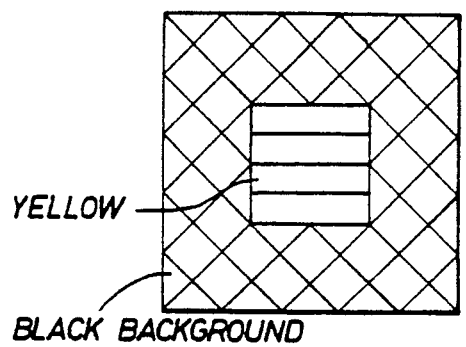
Figure 7:
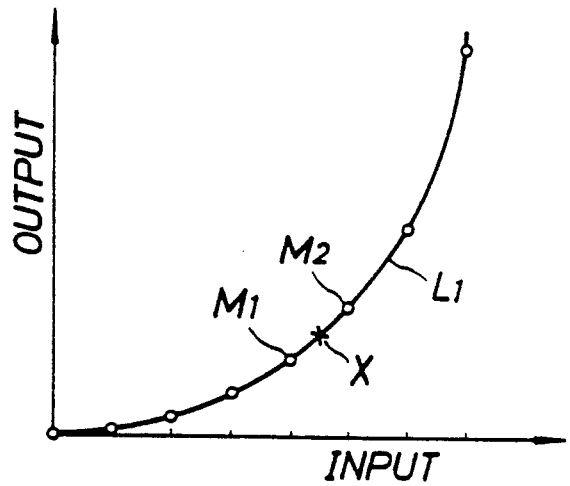
FIG. 7 is a view showing a color correction curve of color correction data according to a color image correction method according to the present invention.
Figure 26:
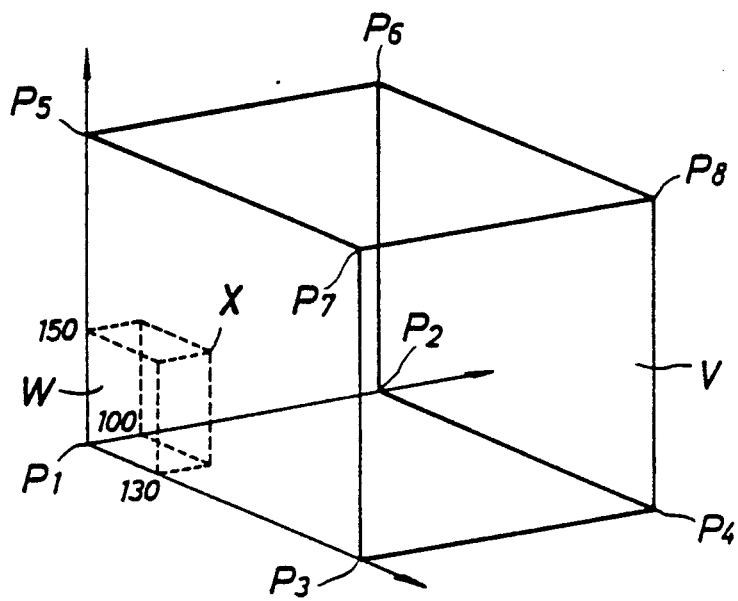
FIG. 26 is a view for explaining interpolation.
Figure 27:
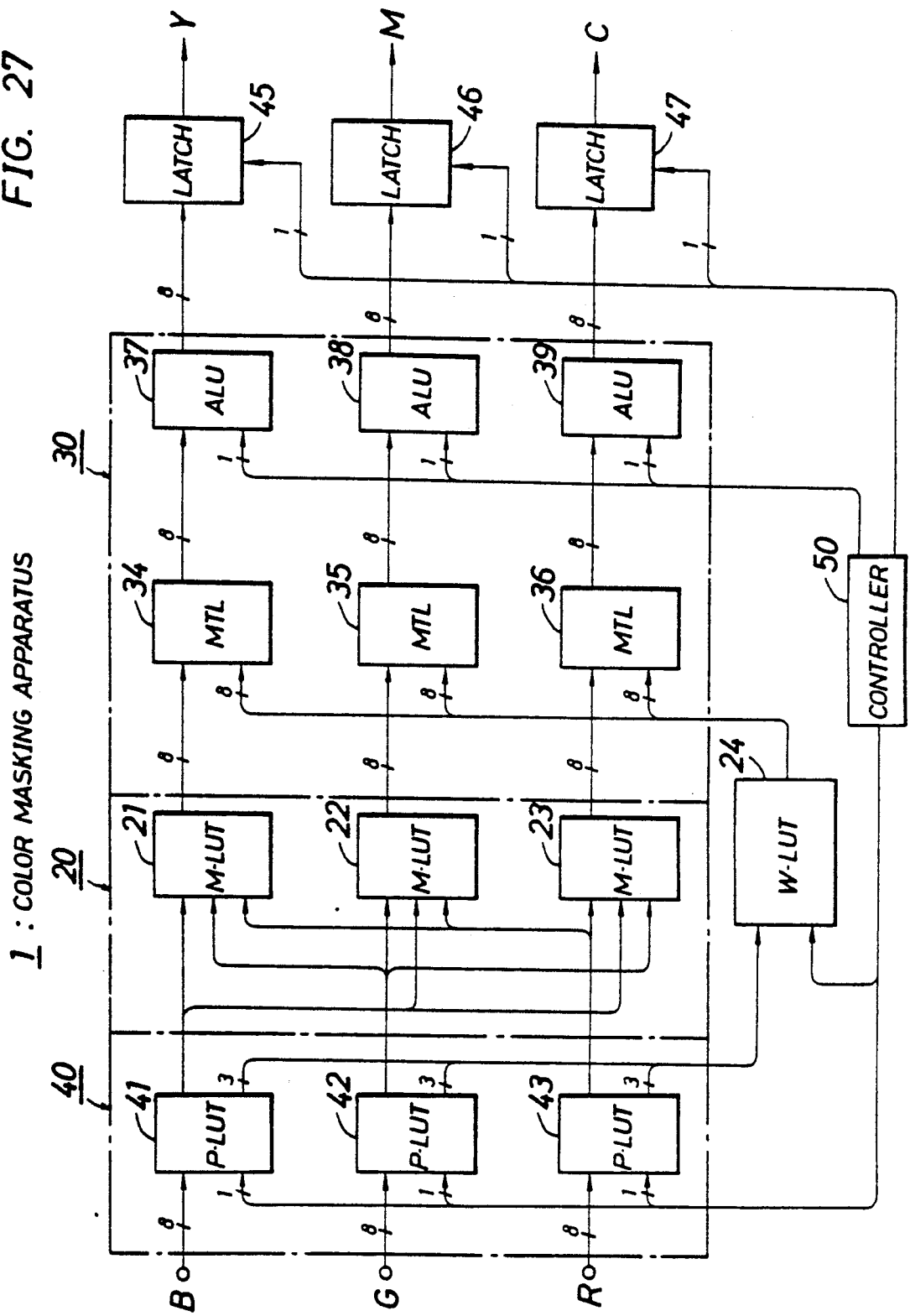
FIG. 27 is a block diagram showing the main part of an embodiment of a color masking apparatus as an arrangement of a color image correction apparatus according to the present invention.

FIGS. 7 and 26 show a color image correction method applied to a color masking method. FIG. 27 shows a practical arrangement for realizing the color masking method, i.e., a color masking apparatus 1.

According to the color masking method of this embodiment, LUTs respectively corresponding to colors as a result of combinations of all colors are not prepared. Accurate color correction data for color combinations of predetermined discrete values are stored in an LUT. If a given color is not the one, data of which is stored in the LUT, the given color is obtained such that image data (the calculated color correction data) of the adjacent points are used to perform interpolation with a weighting average.

Assume a curve for one-input system and one-output system for illustrative convenience. If a curve $L_1$ shown in FIG. 7 is a color correction curve for the input image data, hollow dots on the curve represent discrete color correction data stored in a data table.

If X is color correction data to be calculated, the color correction data X can be interpolated by color correction data $M_1$ and $M_2$ located adjacent to the data X. As a result of interpolation, the color correction data X to be calculated is always located on a line connecting the color correction data $M_1$ and $M_2$ calculated in advance. A color correction error can be minimized, and discrete points of a curve representing corrected colors can be eliminated.

The principle of the color image correction method will be described below.

Figure 8:
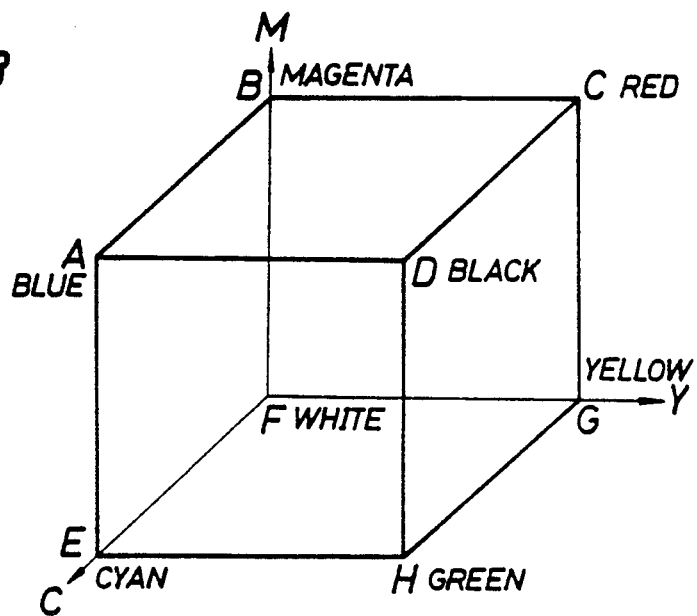
FIG. 8 is a view for explaining a color image correction method according to the present invention.

For the sake of simplicity, the basic colors are limited to three colors, i.e., Y, M, and C. Infinite intermediate colors on the color photographic light-sensitive material such as print paper can be expressed by combinations of densities of Y, M, and C. The expression range is a three-dimensional pattern. When a Y-M-C coordinate system is employed, the expression range is three-dimensionally illustrated, as shown in FIG. 8. When the Y-M-C coordinate system is converted into an X-Y-Z display system, the converted system is three-dimensionally illustrated, as shown in FIG. 9.

Vertices A to H in FIG. 8 correspond to vertices A' to H', respectively.

Figure 9:
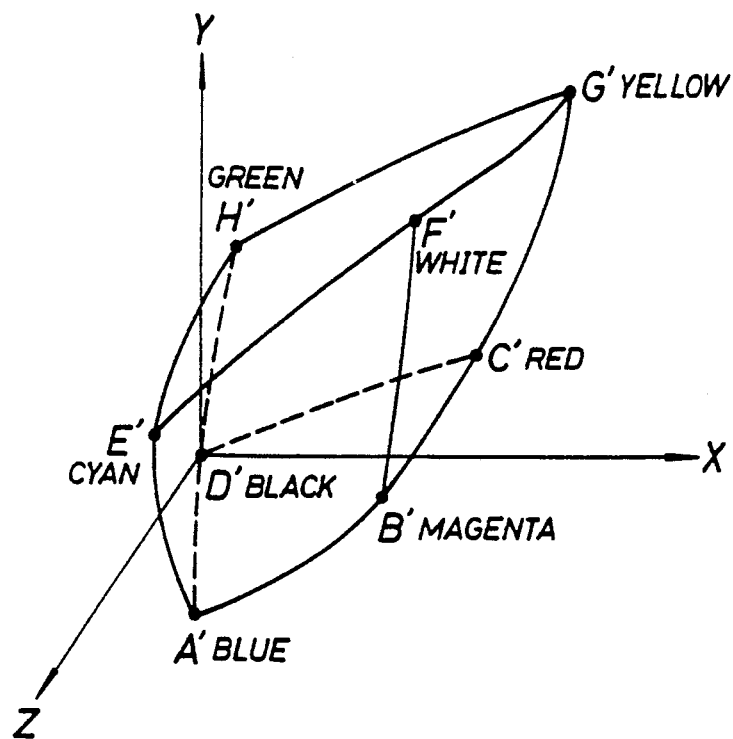
FIG. 9 is a view showing an L*-u*-v* color system.

As is apparent from FIG. 9, most of the three-dimensional patterns for determining the expression ranges are deformed, each side of the pattern is not necessarily a straight line, and each surface is a complicated curved surface.

A predetermined intermediate color can be reproduced by a proper combination of Y, M, and C if the components of the predetermined intermediate color are defined within the three-dimensional pattern. For this purpose, the color correction data to be plotted within this pattern must be generated. According to the present invention, there is provided a method of determining the mixing ratio of Y, M and C components so as to cause them to fall within the above pattern.

For illustrative convenience, only two basic colors (e.g., Y and M) are used, and then an algorithm using the original basic colors will be described.

Figure 10:
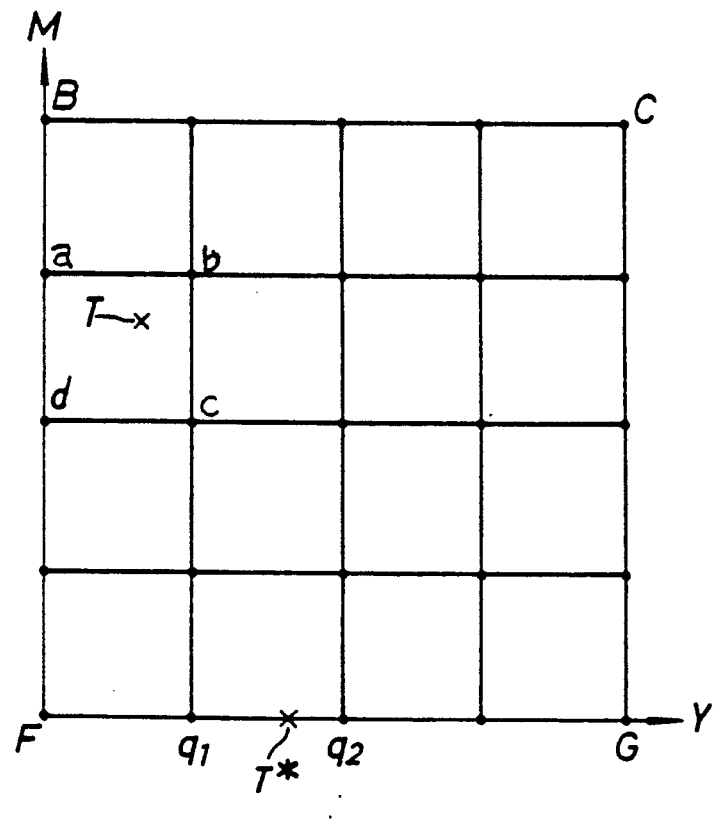
FIG. 10 is a table for explaining a Y-M coordinate system obtained by simplifying the coordinate system in FIG. 8.
Figure 11:
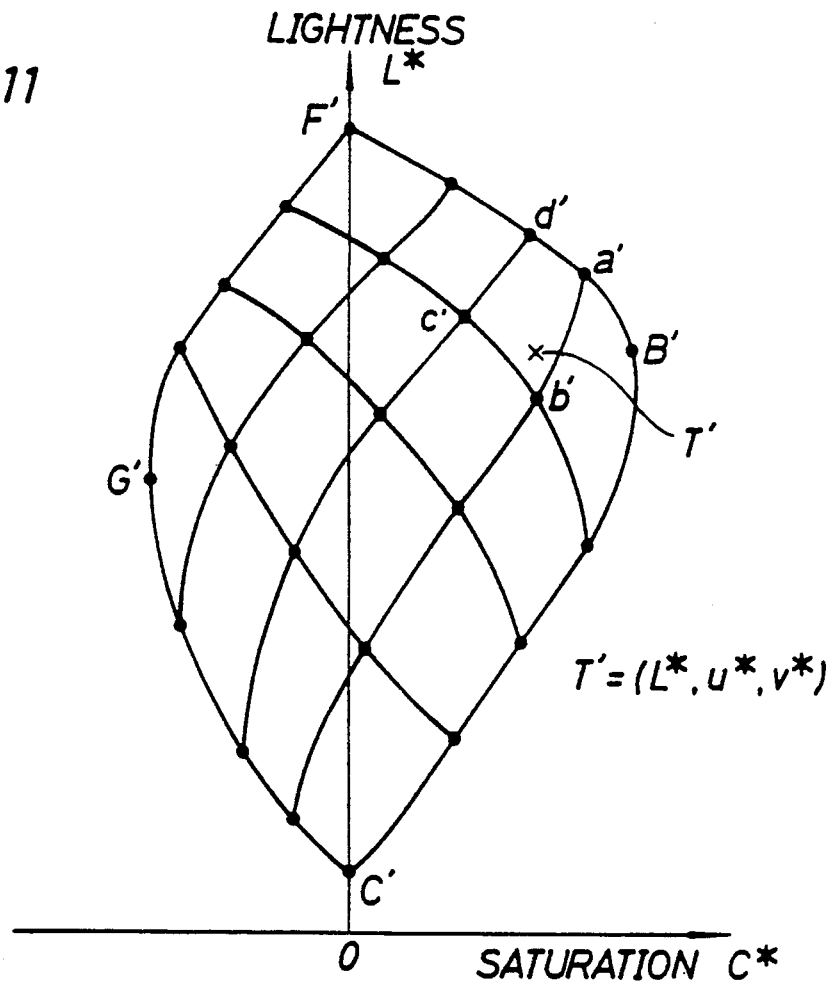
FIG. 11 is a view for explaining a color system representing lightness and saturation.

FIG. 10 is a Y-M coordinate system. The Y-M coordinate system can be mapped into an $L^*-u^*-v^*$ color system, as shown in FIG. 11. Vertices B, C, G, and F of the square in FIG. 10 correspond to vertices B', C', G', and F', respectively.

Color levels of the respective intersections (25 (=5×5) matrix points in this embodiment) are supplied to a color printer to form color patches with these color levels on a recording medium (to be referred to as print paper).

Actual colors are measured based on the resultant color patches, and the measured values are converted into sample values in the color system. These values are plotted in units of matrix points, as shown in FIG. 11.

The number of color patches is preferably large. However, actual color measurement requires a long period of time when the number of color patches is increased. Therefore, 25 (=5×5) color patches in this embodiment are used.

In order to increase the apparent number of color patches, the actual number of color patches can be increased by arithmetic operations. In this case, colors of points falling outside the color patches are approximated using a curve obtained by using three or more known color patches.

Curve interpolation is used as an interpolation method since the three-dimensional pattern representing the color system in FIG. 8 is given as a deformed pattern shown in FIG. 9. As described above, a desired color can be obtained by approximation with a curve of three or more points. Curve interpolation is not only applied to the points in FIG. 10 but also to the points corresponding to those in FIG. 10 by using three or more sample points.

A larger number of color patches may be used. In this case, the number of color patches may be actually increased, or may be increased by interpolation processing. For example, if interpolation operations are performed for the 25 (=5×5) color patches, the apparent number of color patches is 81 (=9×9).

Combinations of the basic colors can be estimated by 25 (=5×5) color patches.

The color patch pattern can be set without taking the human visual sense (identification capability) into consideration. The number of color patches may be determined in consideration of the human visual sense.

As shown in FIG. 11, when a given intermediate color is represented by x (target value T'), combinations of the Y-M coordinate system which represent the given intermediate color are estimated to fall within the region defined by matrix points a to d in FIG. 10.

A shortest distance between the point x and any one of the matrix points is calculated by convergence in the one-to-one correspondence between the display system in FIG. 11 and the color system in FIG. 10.

The color system in FIG. 11 is not solely used to perform convergence so as to correspond the results to points in the coordinate system in FIG. 10 due to the following reason. Although conversion from the coordinate system in FIG. 10 to the color system in FIG. 11 is known, inverse conversion is very complicated and a preferable inverse conversion formula is not yet proposed.

Figure 12:
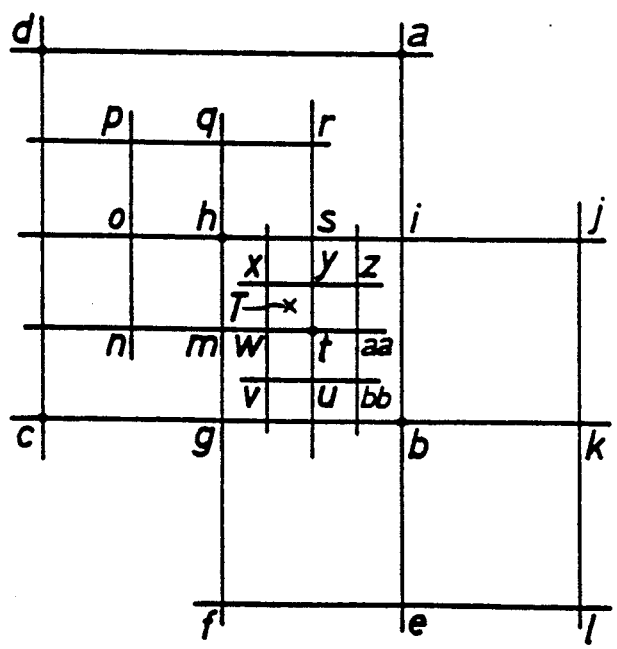

Under these circumstances, the target value T in the coordinate system shown in FIG. 10 is estimated by the following operations. Estimation processing will be described in detail with reference to FIGS. 12 and 13.

By using the target value T' and a total of 25 basic matrix points (FIG. 11), a matrix point which is closest to the point x representing the target value T' is calculated.

In practice, a matrix point having a smallest difference from the point x representing the target value T' is calculated. If the calculated matrix point is given as b', the target value T may be plotted as a matrix point b corresponding to the matrix point b' in FIG. 12.

A total of eight matrix points adjacent to the matrix point b are set and have ½ level intervals. These matrix points are calculated by an average weighting coefficient of the adjacent matrix points. For example, the weighting coefficients of two or four adjacent matrix points are averaged to obtain an average weighting coefficient.

Values corresponding to the resultant matrix points e to l are plotted in the color system in FIG. 13.

A matrix point closest to the point x representing the target value T' is selected from the matrix points e' to l' and b' (a total of nine matrix points) in the same manner as described above. The matrix point intervals are decreased to ¼ to obtain a matrix point h (FIG. 12) corresponding to the calculated matrix point h' and matrix points m to t adjacent to the matrix point h.

The matrix reduction is repeated to obtain the target value T (FIG. 12) corresponding to the converged matrix point value so as to represent the basic color combination (a mixing ratio of Y to M) which represents the intermediate color.

The above estimation operation is repeated in units of target values. Estimated target values may be stored in a memory table and a desired target value may be obtained with reference to a value of an input color image.

When the latter method is used in a color image correction apparatus in practice, look-up tables (LUTs) are used (to be described later).

An algorithm obtained by using three colors as the basic colors will be described below.

Each of the Y, M, and C color components has 256 levels from level 0 to level 255. In this case, five levels are extracted. For example, level 0, level 64, level 128, level 192, and level 255 are selected for each of the Y, M, and C color components. Color patches are created on the basis of all color combinations (5×5×5=125).

Color patches are shown in FIG. 14. A color system of each color patch pattern is preferably a L*-u*-v* or L*-a*-b* color system of the CIE.

The number of color patches is increased by interpolation in the following manner.

A basic matrix is given as $5 \times 5 \times 5 = 125$, the matrix point interval of the basic matrix is given as $\frac{1}{4}$. The L*-u*-v* color system can be interpolated by a curve represented by the following equations. Although various interpolation methods may be proposed by using complicated spline functions or the like, the following simple interpolation method can be practiced.

Figure 15:
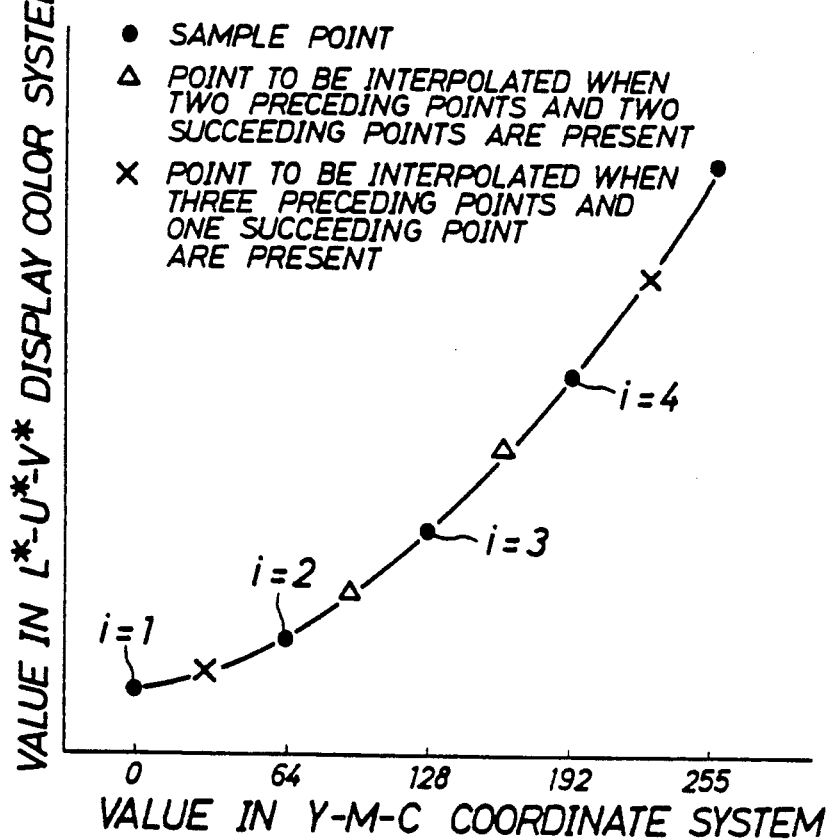
FIG. 15 is a view for explaining curve approximation in the L*-u*-v* color system.

As shown in FIG. 15, a black dot represents a matrix point (sample point) and a triangle Δ and a cross x are points to be interpolated. An interpolation is performed when two preceding matrix points and two succeeding matrix points are present before and after the point to be interpolated or when three preceding matrix points and one succeeding point before and after the point to be sampled are present. Different interpolation equations are used in these different interpolation modes.

The components in the color system for the point to be interpolated are given as $L_m^*$, $u_m^*$, and $v_m^*$, and the components in the color system for each sample point are given as $L_i^*$, $u_i^*$, and $v_i^*$ (i=1 to 4). The former components can be interpolated by the following equations:

$$L_m^* = -(1/16)L_1^* + (9/16)L_2^* + (9/16)L_3^* - (1/16)L_4^*$$

$$u_m^* = -(1/16)u_1^* + (9/16)u_2^* + (9/16)u_3^* - (1/16)u_4^*$$

$$v_m^* = -(1/16)v_1^* + (9/16)v_2^* + (9/16)v_3^* - (1/16)v_4^*$$

The components of the latter color system can be calculated by the following interpolation equations:

$$L_m^* = (5/16)L_1^* + (15/16)L_2^* - (5/16)L_3^* - (1/16)L_4^*$$

$$u_m^* = (5/16)u_1^* + (15/16)u_2^* - (5/16)u_3^* - (1/16)u_4^*$$

$$v_m^* = (5/16)v_1^* + (15/16)v_2^* - (5/16)v_3^* - (1/16)v_4^*$$

Figure 16:
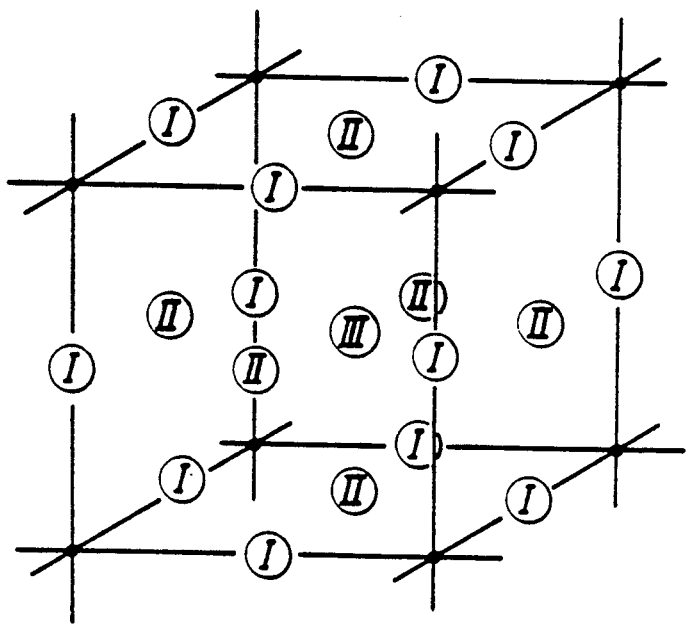
FIG. 16 is a view for explaining sample expansion performed in curve approximation.

The interpolation order will be exemplified as an order of I, II, and III in FIG. 16.

Figure 17:
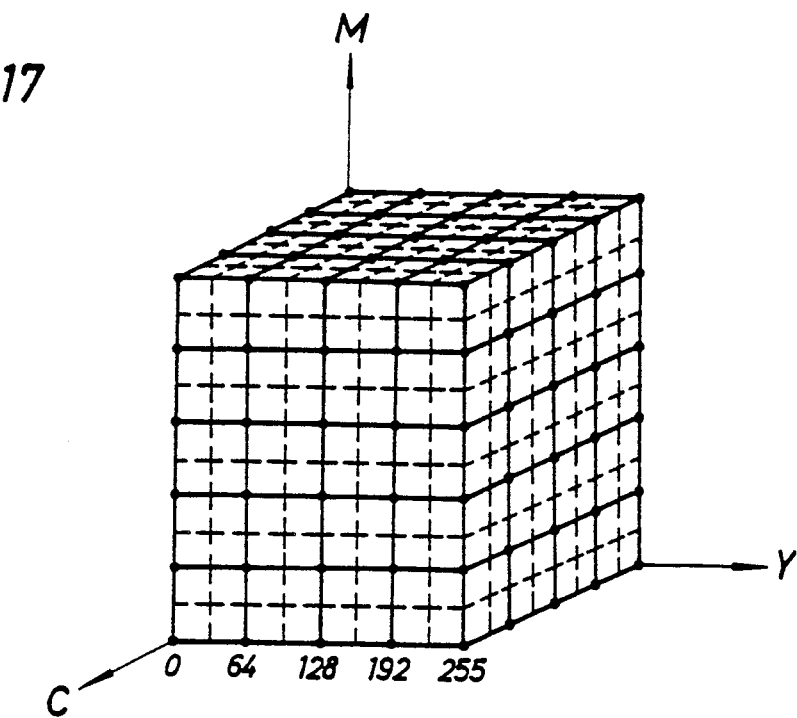
FIG. 17 is a view for explaining a coordinate system obtained by expansion of the sample points.

By the above interpolation operations, although the actual number of actual color patches is 125, the apparent number of color patches can be increased to 729 by electrical processing. The resultant color patch pattern of the Y-M-C coordinate system is shown in FIG. 17.

The above coordinate system is mapped to the L*-u*-v* color system in FIGS. 18A, 18B, and 18C.

FIG. 18A shows a projected image when viewed from the L*-axis in the L*-u*-v* color system, FIG. 18B shows a projected image along the L*-v* plane, and FIG. 18C shows a projected image along the L*-u* plane.

By using a total of 729 color patches prepared by the above interpolation processing, the target value T can be estimated.

In order to calculate a matrix point to which the point x representing the target value T' is closest, the following evaluation functions, E can be used.

$$\Delta E = |L_T^* - L_i| + |u_T^* - u_i^*| + |v_T^* - v_i^*| \text{ or}$$

$$\Delta E = [(L_T^* - L_i^*)^2 + (u_T^* - u_i^*)^2 + (v_T^* - v_i^*)^2]^{\frac{1}{2}}$$

Either evaluation function may be used.

When the final target value T is calculated by convergence, it takes a long period of time. In practice, an algorithm may be employed wherein all calculations are completed by a few convergence calculations.

For example, if the basic matrix intervals are defined by 64 quantization steps, the matrix interval (division interval) is given as 32 by the above interpolation processing. In this case, an algorithm is employed wherein five convergence operations are performed at the matrix intervals of 16, 8, 4, 2, and 1.

A target value can be therefore estimated with sufficiently high precision.

Figure 19:
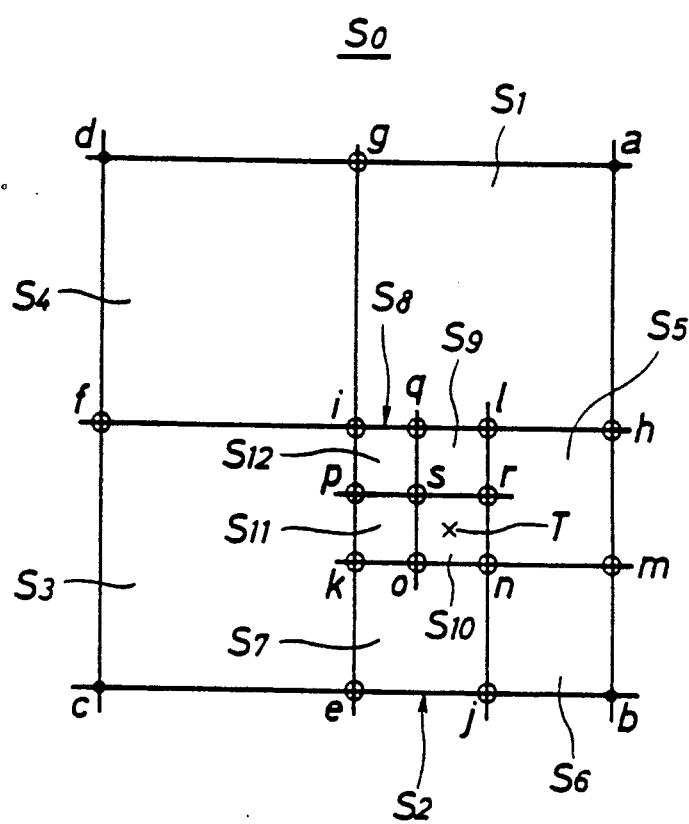

Another estimation processing different from that described above will be described with reference to FIGS. 19 and 20.

The target value T' and 25 basic matrix points as a result of combinations of Y and M are used in the same manner as in the previous method. One of the regions, defined by the 25 matrix points, in which the target value T' is included is determined by a geometric relationship between the target value T' point and the matrix points serving as the vertices of the regions.

In practice, a given region is selected by checking coordinates of vertices of the regions in accordance with predetermined conditions (to be described later). If the selected region is given as S0', the target value T can be estimated to be included in a region S0 corresponding to the region S0'.

The estimated region S0' is divided into four parts. In other words, a point for dividing the matrix point interval into $\frac{1}{2}$ is calculated. Five matrix points (points to be divided) e to i can be calculated by averaging the weighting coefficients of adjacent matrix points a to d calculated beforehand. For example, the weighting coefficients of the adjacent two or four matrix points are averaged.

Values corresponding to the new matrix points e to i are plotted in the color system shown in FIG. 20.

A region S2' which includes the target value T' is selected from four regions S1' to S4' divided by the matrix points e' to i' in the same manner as described above. A region S2 (FIG. 19) corresponding to the region S2' is calculated by dividing the region S0 into four parts.

The above divisions are repeated to gradually reduce the size of the matrix of interest, and the target value can be finally converged. Values of four vertices of the converged region (S10' in FIG. 20 for illustrative convenience) are averaged, and the target value T included in the corresponding region S10 is obtained as a basic color combination (mixing ratio of Y to M) for reproducing an intermediate color.

An algorithm obtained by using three basic colors (Y, M, and C) will be described.

In this case, each of the Y, M, and C color components has 256 levels from level 0 to level 255. Level 0, level 64, level 128, level 192, and level 255 are extracted for each color component. By using color patches ($5 \times 5 \times 5 = 125$) as a result of all combinations of the colors, interpolation is performed to obtain 729 color patches, as described above.

The point x representing the target value T' is determined by the following conditions. Assuming a given three-dimensional pattern, if coordinates of each of eight vertices are given as $L_i^*$, $u_i^*$, and $v_i^*$ ($i=1$ to 8) and coordinates of the point x of the target value T' are defined as $L_T^*$, $u_T^*$, and $v_T^*$, the following conditions are given:

$L_i^* \leq L_T^*$
$L_i^* \geq L_T^*$
$u_i^* \leq u_T^*$
$u_1^* \geq u_T^*$
$v_i^* \leq v_T^*$
$v_i^* \geq v_T^*$ If the above conditions are satisfied, the target value is included in the three-dimensional pattern.

The above conditions are given such that a plane passing through the target point T' (infinite planes are considered on the basis of infinite gradients) is taken into consideration and any one of the eight vertices must be present in each one of the spaces divided by the plane.

In the above case, planes perpendicular to the $L^*$-, $u^*$-, and $v^*$-axes are considered, and the conditions are generally given as follows:

$$\alpha L_i^* + \beta u_T^* + \gamma v_T^* \leq \alpha L_T^* + \beta u_T^* + \gamma v_T^*$$

$$\alpha L_i^* + \beta u_T^* + \gamma v_T^* \geq \alpha L_T^* + \beta u_T^* + \gamma v_T^*$$

where $\alpha$, $\beta$ and $\gamma$ are real numbers.

When the final target value T is calculated by interpolation calculations for all three-dimensional patterns and the basic matrix intervals are defined by the 64 quantization steps, the matrix interval (the divided interval) is given as 32 by interpolation. In this case, an algorithm may be employed wherein five convergence operations are performed at the matrix intervals of 16, 8, 4, 2, and 1.

The target value can be estimated with sufficiently high precision.

In the case described above, the following color patches are created. That is, each of the Y, M, and C color components has 256 levels from level 0 to level 255 and five levels, i.e., level 0, level 64, level 128, level 192, and level 255 are extracted for each color component, thereby obtaining color patches as a result of all color combinations ($5 \times 5 \times 5 = 125$).

The numbers of levels for the respective color components in the color patches may be different from each other. When color patches are to be created in consideration of the identification power of a human eye, the numbers of levels for the respective color components may vary due to the following facts. The human eye has the highest identification power for M (magenta) and the lowest identification power for Y (yellow). The number of M color patches can be small and the number of Y color patches can be large. For example, $$Y \cdot M \cdot C = 3 \times 5 \times 4$$

is shown in FIG. 21.

When the color patches are created in consideration of the identification power of a human eye, the Y, M, and C components are divided at equidistant intervals and therefore substantially equal effects can be obtained.

The number of color patches can be reduced, and the color component measurement time can be shortened.

In order to generalize the above relationship, patch counts PY, PM, and PC of the Y, M, and C color components are set to satisfy the following condition:

$PY < PC \leq PM$

The number of color patches can be increased by the above-mentioned interpolation operations.

When the color patches shown in FIG. 17 are obtained by interpolation, the interpolated points (vertices of the three-dimensional pattern) can be calculated by five convergence operations in accordance with curve approximation. However, only linear approximation operations can be used.

Interpolation by linear approximation is performed as follows.

Figure 22:
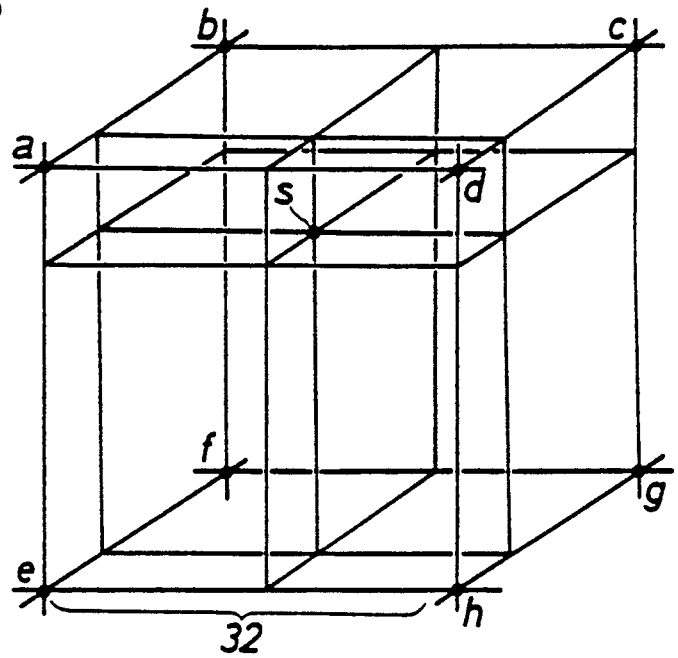
FIG. 22 is a view for explaining interpolation.

An interpolated point s shown in FIG. 22 is assumed. If coordinates of the interpolated point s are given as $L_s^*$, $u_s^*$, and $u_s^*$ in the $L^*$-$u^*$-$v^*$ color system, the following interpolation equations are established:

$$L_s^* = \left( 1 / \sum_{i=A}^{H} M_i \right) \sum_{i=A}^{H} M_i \cdot L_i^*$$

$$u_s^* = \left( 1 / \sum_{i=A}^{H} M_i \right) \sum_{i=A}^{H} M_i \cdot u_i^*$$

$$v_s^* = \left( 1 / \sum_{i=A}^{H} M_i \right) \sum_{i=A}^{H} M_i \cdot v_i^*$$

A one-to-one correspondence is established between the coordinates $L_s^*$, $u_s^*$, and $v_s^*$ and the coordinates of the Y-M-C coordinate systems.

$M_i$ is a volume of a rectangular prism including the diagonal vertices and the interpolated point s. In the case of FIG. 17, $M_i$ is defined as follows:

$$\sum_{i=A}^{H} M_i = 32^3$$

The interpolation will be described in detail with reference to a color image correction apparatus (to be described later).

Figure 23:
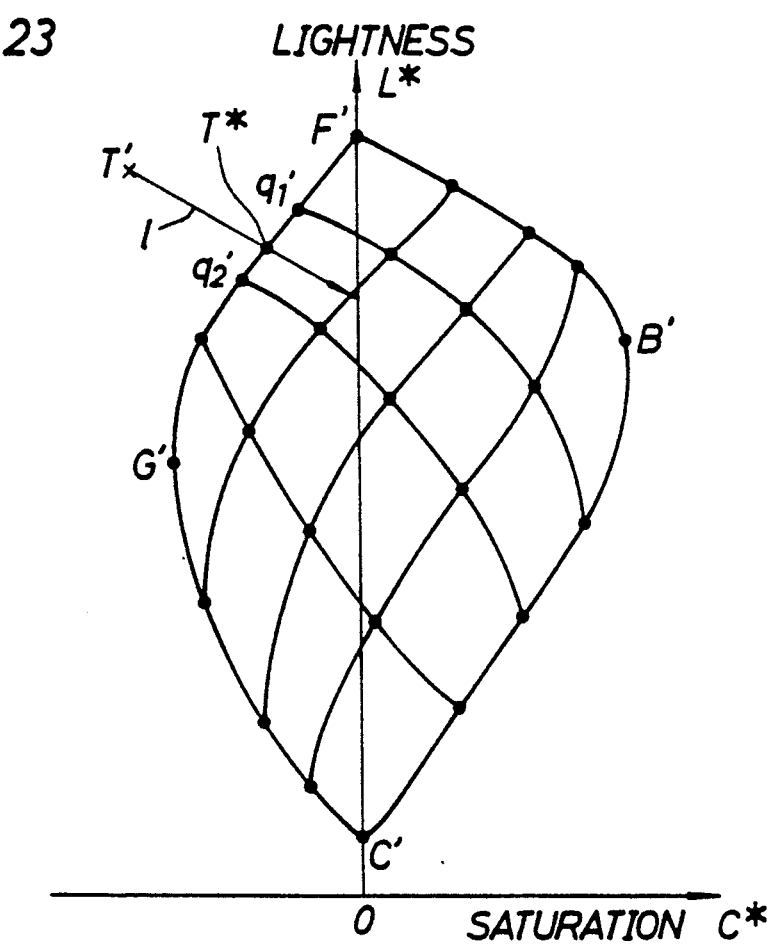
FIG. 23 is a view for explaining estimation when a target value is plotted outside the pattern.

In the above description, estimation is performed such that all the target values T are included in the three-dimensional pattern shown in FIG. 9. However, if a target value is present outside the three-dimensional pattern, as shown in FIG. 23, following estimation processing is performed. For illustrative convenience, the Y-M-C coordinate system is not used.

The target value T' is present outside the three-dimensional pattern because the color reproduction range of the output system is narrower than the color reproduction range of the input system.

In this case, the saturation level of the color is shifted in the direction of the achromatic color without changing its hue, and a color represented by an intersection between a straight line in the direction of the achromatic color and the boundary of the color reproduction range is defined as a target value T*.

In this case, the target value T* is assumed to be located on a line connecting matrix points q1 and q2 in FIG. 10 In the same manner as described above, points q1' and q2' (FIG. 23) are divided and converged in a one-to-one correspondence with the Y-M-C coordinate system, thereby achieving the estimation operation.

The estimation algorithm is obtained by adding the following algorithm to the above-mentioned algorithm.

When one of the Y, M, and C color components is zero or a maximum, the target value T' is determined to be located outside the three-dimensional pattern, i.e., outside the color reproduction range.

Figure 24:
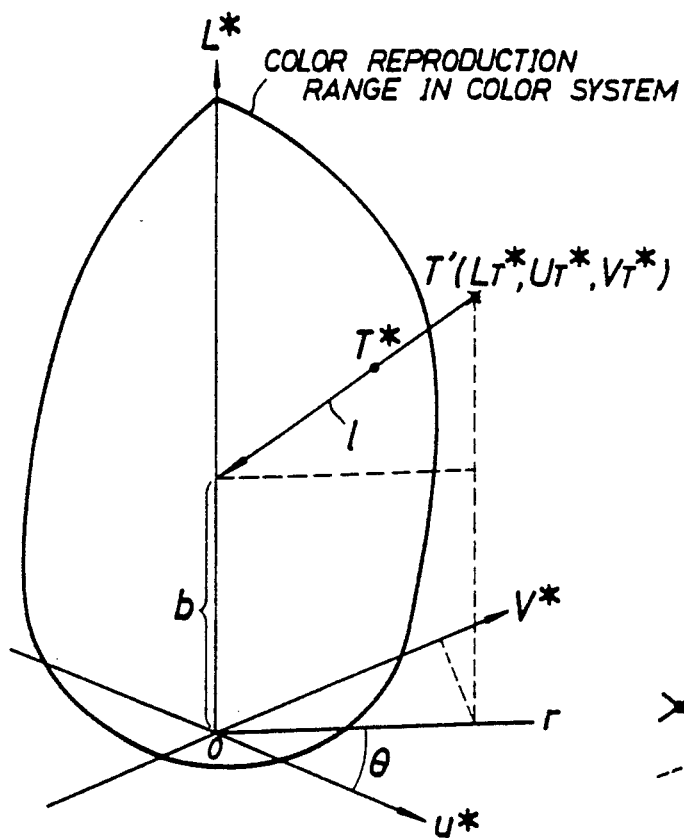
FIG. 24 is a view showing a cylindrical coordinate system so as to represent the color reproduction range in the display system.

In this case, as shown in FIG. 24, a line l passing through the target value T' and the axis of achromatic color (one point on the L*-axis) is assumed, and the line l and a gradient $\theta$ between the line l and the u*-v* plane are defined as follows:

$$l = ar + b$$

$$\theta = \arctan(u_T^*/v_T^*)$$

where a and b are any real numbers and differ from a and b in FIG. 10.

In order to keep the lightness in addition to the hue, condition $l = LT^*$ is established.

Of the sample points, cylindrical coordinates $(\theta, r, l)$ (hue, saturation, lightness) of the sample point located on the outer surface of the cylindrical pattern are calculated, and the calculated coordinates are stored in a memory.

Of the sample points (matrix points represented by the solid dots in FIG. 25) stored in the memory, four sample points are selected to form a minimum square, and cylindrical coordinates for the minimum square are represented by $(\theta_i, r_i, l_i)$.

It is then checked how four points satisfy the following conditions:

$$\theta \leq \theta_i \leq \theta + 180° \quad \text{(for } i = 1 \text{ to 4)}$$

$$\theta - 90° \leq \theta_i \leq \theta + 90° \quad \text{(for } i = 1 \text{ to 4)}$$

$$\theta - 180° \leq \theta_i \leq \theta \quad \text{(for } i = 1 \text{ to 4)}$$

$$ar_i + b - l_i \geq 0 \quad \text{(for } i = 1 \text{ to 4)}$$

$$ar_i + b - l_i \leq 0 \quad \text{(for } i = 1 \text{ to 4)}$$

If the above conditions are satisfied, the converged line l probably passes through the minimum square.

Such conditions as the above can be repeatedly assumed without limit. The above mentioned conditions are used because they require simple calculations.

Figure 25:
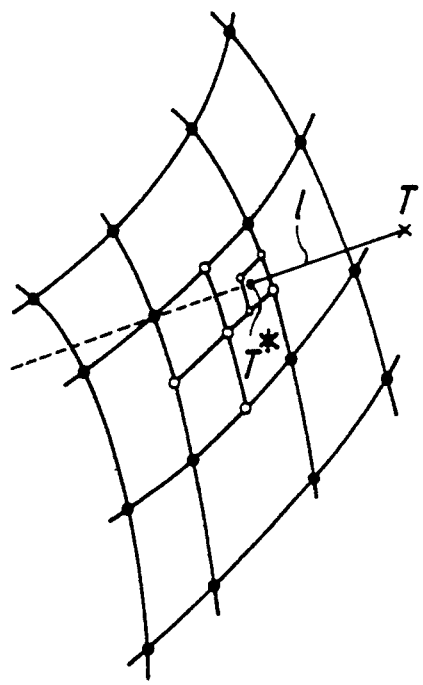
FIG. 25 is a view for explaining convergence.

A middle point represented by a hollow dot in FIG. 25 is obtained from vertex coordinates of the minimum square on the basis of the weighting average, and the outer surface is divided into four parts.

The above conditions are applied to the divided parts, and the above operations are then repeated a total of seven times. The average value of the Y-M-C coordinate system which corresponds to the vertex of the 7th operation is used as a substitute T* of the target value T.

An arrangement of a color image correction apparatus (color masking apparatus) for practicing the above color image correction method according to the present invention will be described with reference to FIG. 26.

In this embodiment, the target values calculated as described above, that is, color correction data are prestored in an LUT (look-up table). For example, if an input system is a color CRT, the color correction data of the matrix points which correspond to the coordinate system (the same coordinate system as in FIG. 20) of the basic colors determined by the B, G and R components are stored, and color correction data of the points excluded from the matrix points are calculated by interpolation operations.

When input or output gradation levels are small, discrete color correction data need not be stored, but all color correction data can be stored in the memory.

Interpolation processing of the correction color data will be described with reference to FIG. 26.

In this arrangement, a space region V of a rectangular prism constituted by eight color correction data (i.e., the known calculated color correction data $P_1$ to $P_8$ corresponding to the C, M, and Y components) included in the space (the interpolated point s corresponds to a diagonal vertex) of a rectangular prism determined by three input image data R, G, and B is determined. Space regions W and V have a reference point as $P_1$.

The regions W and V have color correction values for the combinations at points of 0, 32, 64, 96, 128, 160, 192, 224, and 255.

If the input image data R, G, and B have the value corresponding to the coordinates (100,130,150), interpolation is performed using the color correction data of the vertices (matrix points) of the space region defined by the following eight points.

$P_i$ ($i = 1$ to 8) on the left-hand side represents coordinates of each vertex of the space region V, and the right-hand side represents color correction data $C_i$, $M_i$, and $Y_i$ as follows:

$P_1$:
$(96, 128, 128) = (C_1, M_1, Y_1)$
$P_2$:
$(128, 128, 128) = (C_2, M_2, Y_2)$
$P_3$:
$(96, 160, 128) = (C_3, M_3, Y_3)$
$P_4$:
$(128, 160, 128) = (C_4, M_4, Y_4)$
$P_5$:
$(96, 128, 160) = (C_5, M_5, Y_5)$
$P_6$:
$(128, 128, 160) = (C_6, M_6, Y_6)$
$P_7$:
$(96, 160, 160) = (C_7, M_7, Y_7)$
$P_8$:
$(128, 160, 160) = (C_8, M_8, Y_8)$

The relationship between the space region V defined by these eight vertices $P_1$ to $P_8$ and the space region W defined by the input image data is shown in FIG. 26.

A weighting coefficient of each vertex $P_i$ in the space region V is calculated as follows.

The same equations as in the weighting coefficient equations in the L*-u*-v* color system can be employed.

The volume of the space region W of the rectangular prism, which is calculated treating the vertex opposite to the correction point to be weighted and the interpolated point s approximated by x, as the diagonally opposite corners of a weighting volume, which is defined as proportional to a weighting coefficient for the correction point to be weighted.

The weighting coefficient of the point $P_8$ is represented using the coordinates of the point $P_1$ and X as follows:

$$(100, 130, 150) - (96, 128, 128) = (4, 2, 22)$$

The volume of the space region of the rectangular prism which is defined by X and $P_1$ is calculated as follows:

$$4 \times 2 \times 22 = 176$$

The product serves as a weighting coefficient of the point $P_8$.

Similarly, the weighting coefficients of the remaining points $P_1$ to $P_7$ are calculated as follows:

$P_1 = 8400 \quad P_2 = 1200$ $P_3 = 560 \quad P_4 = 80$ $P_5 = 18480 \quad P_6 = 2640$ $P_7 = 1232 \quad P_8 = 176$ The sum of these weighting coefficients is equal to the volume of the space region V of the rectangular prism and is 32,768 (a) in this embodiment. Therefore, the correction values $C_s$, $M_s$, and $Y_s$ at the point x are defined as follows:

$C_x = 1/a(P_1C_1 + P_2C_2 + P_3C_3 + P_4C_4 + P_5C_5 + P_6C_6 + P_7C_7 + P_8C_8)$ $M_x = 1/a(P_1M_1 + P_2M_2 + P_3M_3 + P_4M_4 + P_5M_5 + P_6M_6 + P_7M_7 + P_8M_8)$ $Y_x = 1/a(P_1Y_1 + P_2Y_2 + P_3Y_3 + P_4Y_4 + P_5Y_5 + P_6Y_6 + P_7Y_7 + P_8Y_8)$

The correction values at the point x to be calculated can be represented as follows when the eight adjacent correction values are defined by $C_i$, $M_i$, and $Y_i$ (these values of the Y-M-C coordinate system correspond to the interpolated values $L_s^*$, $u_s^*$, and $v_s^*$ in the color system) and the weighting coefficients are represented by Ai:

$$C_x = \left(1 / \sum_{i=1}^{8} Ai\right) \sum_{i=1}^{8} A_i \cdot C_i$$

$$M_x = \left(1 / \sum_{i=1}^{8} Ai\right) \sum_{i=1}^{8} A_i \cdot M_i$$

$$Y_x = \left(1 / \sum_{i=1}^{8} Ai\right) \sum_{i=1}^{8} A_i \cdot Y_i$$

The point for the color correction data is not limited to the one described above.

The number of color correction data is a power of 2 in consideration of the ROM capacity in practice. When a 256-kbit ROM is used, 32 color correction data per color (i.e., $32^3 = 32,768$ points for three colors) are used. In this case, the number of divided space regions is $(32-1)^3 = 29,791$.

The method of calculating the color correction data at each matrix point is not limited to the method described above but can be replaced with various other methods. A simple method is a conventional nonlinear masking method. According to this method, color correction data is calculated at each matrix point by using a polynomial of a higher order for minimizing the error. In this case, the polynomial is not associated with hardware and is calculated beforehand. The polynomial may include any complicated terms (e.g., an inverse number, a power of n, and a logarithm).

Polynomials according to nonlinear masking are generally represented as follows:

C = fC(B,G,R)
M = fM(B,G,R)
Y = fY(B,G,R)

where B, G, and R are matrix points.

An arrangement of the color masking apparatus 1 is shown in FIG. 27.

As is apparent from the above description, the color masking apparatus 1 comprises a color correction information memory means (color correction data memory means) 20 for storing a plurality of color correction data, a weighting information memory means (weighting coefficient memory means) 24, and a processing means comprising a multiplier/accumulator means 30 for multiplying the accessed color correction data with the corresponding weighting coefficients and adding the products and a dividing means. The dividing means may be omitted depending on the circuit arrangements.

The color correction data memory means 20 stores color correction data for combinations of three color image data located at vertices of a plurality of space regions obtained by dividing a color space constituted by three color image data subjected to color correction.

The weighting coefficient memory means 24 outputs weighting data for a plurality of color correction data read out from the color correction data memory means on the basis of the input three color image data.

The processing means calculates and outputs finally corrected color image data on the basis of the plurality of color correction data read out from the color correction data memory means 20 in response to the input color image data.

FIG. 27 shows a color masking apparatus for simultaneously obtaining three color correction data C, M, and Y according to the present invention. A color masking apparatus in FIG. 27 is arranged to sequentially output the three color correction data C, M, and Y in the order named according to the present invention.

The detailed arrangements of the circuit components in the simultaneous color masking apparatus 1 shown in FIG. 27 will be described in detail.

The color correction data memory means 20 includes LUTs 21 to 23 for storing color correction data for the C, M, and Y color components. The weighting coefficient memory means 24 also comprise an LUT.

Read address signals are supplied to the color correction data memory means 20 and the weighting coefficient memory means 24. Input image data B, G, and R are temporarily supplied to an address signal generating means 40 and address signals corresponding to the input levels are output. The address signal output means comprises LUTs 41 to 43. A bipolar ROM is used to arrange the LUT. A one-bit selection signal is supplied from a controller 50 to the LUTs 41 to 43, and a detailed description thereof will be made later.

The eight successive color correction data and the corresponding eight successive weighting coefficient data (to be referred to as a weighting coefficient hereinafter) in response to the input levels of the input image data are sequentially supplied to a multiplier/accumulator means 30.

The multiplier/accumulator means 30 calculates $A_iK_i$ ($K_i$ represents all of C, M, and Y) and calculates a sum of the products. The multiplier/accumulator means 30 comprises multipliers 34 to 36 and adders 37 to 39.

Each of the multipliers 34 to 36 comprises a 512-kbit ROM. The multipliers 34 to 36 receive the color correction data (8 bits) of the respective color components and the corresponding weighting coefficients $A_i$ and performs multiplications $A_iK_i$. The product outputs of the upper 8 bits are supplied to the adders (ALU) 37 to 39. The adders 37 to 39 add the corresponding products.

Each of the adders 37 to 39 calculates the sums on the order of 16 bits. Each sum output (sum of the products) comprises the upper eight bits of the sum. Therefore, an output can be obtained as a signal obtained by dividing the sum output by the weighting coefficient Ai. In this case, the dividers can be omitted.

The sum outputs each consisting of the upper eight bits are latched by latches 45 to 47. A latch pulse is generated by the controller 50.

The arrangements of the circuit components will be described in more detail.

In the color correction data memory means 20, the LUTs 21 to 23 for storing accurate color correction data corresponding to the C, M, and Y color components are used.

If each of the LUTs 21 to 23 comprises a 256-kbit ROM, 32 points between the minimum and maximum levels of the input image data are extracted. 32 color correction data per color (i.e., $32^3 = 32,768$ points for three colors) can be stored in the corresponding LUT.

If 256 gradation input levels are prepared, they are grouped into 32 levels obtained by dividing 256 (levels) by 32 (points) in the following manner:

0, 8, 16,... 240, 248

The interval between level 248 and level 255 which serves as the 33rd point is not used, or the interval between level 249 and level 255 serves as level 248.

The correction data thus defined by the gradation levels can be accurately calculated, and the plurality of calculated color correction data are stored in the LUTs 21 to 23.

When the division points are restricted to 32 points, a versatile 8-bit ROM can be used, and the memory means 20 can be arranged at low cost.

The weighting coefficient memory LUT 24 stores weighting coefficients $A_i$ at the respective division points. When the division is performed in units of 8 bits, a total number of weighting coefficients $A_i$ used eight times are:

$$8 \times 8 \times 8 = 512$$

As described above, when a commercially available versatile IC for generating an 8-bit output is used, the number of elements is increased when the theoretical number of coefficients (a maximum of 512) is assumed. An approximated value obtained by compressing the theoretical value into about ½ is used as a practical value.

In the following case, the sum of the weighting coefficients used eight times is always set to be 256, and the maximum weighting coefficient is 255.

Referring to FIG. 26, if x coincides with $P_1$, the weighting coefficients for $P_1$ to $P_8$ are represented by theoretical values in parentheses:

| $P_1$ | $P_2$ | $P_3$ | $P_4$ | $P_5$ | $P_6$ | $P_7$ | $P_8$ |
|---|---|---|---|---|---|---|---|
| 255 | 0 | 0 | 0 | 0 | 0 | 0 | 1 |
| (512 | 0 | 0 | 0 | 0 | 0 | 0 | 0) |

A total number of weighting coefficients is 256.

When the point x is located between $P_1$ and $P_3$ and is separated from $P_1$ by 3 (i.e., from $P_3$ by 5), the weighting coefficients of $P_1$ to $P_8$ are given as follows:

| $P_1$ | $P_2$ | $P_3$ | $P_4$ | $P_5$ | $P_6$ | $P_7$ | $P_8$ |
|---|---|---|---|---|---|---|---|
| 180 | 0 | 96 | 0 | 0 | 0 | 0 | 1 |
| (320 | 0 | 192 | 0 | 0 | 0 | 0 | 0) |

The weighting coefficients are selected such that its total number is 256.

Similarly, if the point is separated from the $P_1$-$P_2$-$P_3$-$P_4$ plane by 3, $P_1$-$P_3$-$P_5$-$P_7$ plane by 1, and $P_1$-$P_2$-$P_5$-$P_6$ plane by 5, the following weighting coefficients for $P_1$ to $P_8$ are obtained:

| $P_1$ | $P_2$ | $P_3$ | $P_4$ | $P_5$ | $P_6$ | $P_7$ | $P_8$ |
|---|---|---|---|---|---|---|---|
| 53 | 7 | 88 | 12 | 32 | 4 | 53 | 7 |
| (105 | 15 | 175 | 25 | 63 | 9 | 105 | 15) |

The weighting coefficients are properly selected such that its total number is 256.

Referring to FIG. 7, the 1-bit selection signal is a control signal for designating color correction data M1 and M2 before and after the point x.

For illustrative convenience, a relationship between 32 points (matrix points) and the corresponding address signals is established, as shown in FIG. 28.

If the input image data has level 100, address signals (address Nos. 12 and 13) must be generated to produce the immediately preceding and succeeding color correction data (level 96 and level 104) from the color correction data memory means 20.

If the selection signal is set at logic "0", the address signal (12) is generated to read out the smaller color correction data (96). However, if the selection signal is set at logic "1", the address signal (13) is generated to read out the larger color correction data (104).

Assuming that the maximum value (248 in this case) is used. If the selection signal is set at logic "0", the color correction data corresponding to the value, i.e., 248 is selected. However, if the selection signal is set at logic "1", the smaller color correction data (240 in this case) is selected.

The selection signal is also supplied to the weighting coefficient memory means 24.

If a recording medium such as print paper is used, a sensitivity difference between lots is present. In consideration of such a sensitivity difference, the color correction data for correcting a plurality of sensitivity differences depending on the lots must be used. However, it is impossible to actually provide the color correction data memory means 20 in accordance with the sensitivity differences, thus resulting in an impractical application.

If the common color correction data memory means 20 is used, it is possible to realize such a means without great difficulties.

FIG. 29 shows a color masking apparatus 10 suitable for such an arrangement. Input image data B, G, and R are temporarily supplied to the color masking apparatus 10 through input value correction LUTs 55 to 57. A color correction data memory means 20 stores color correction data corresponding to one type of sensitivity.

The color correction data from the color correction data memory means 20 and the corresponding weighting coefficient are used to calculate image data to be corrected. The corrected image data are supplied to the sensitivity correction LUTs 61 to 63, and the sensitivity is corrected depending on the print paper used.

The different types of sensitivity correction values corresponding to different sensitivity levels are stored in the sensitivity correction LUTs 61 to 63. The correction value is selected depending on the sensitivity of the print paper used.

The input and output characteristics of the sensitivity correction LUT are determined in consideration of the human visual sense. If the input/output characteristic sensitivity correction curve shown in FIG. 30 is used, generation of the spurious edge caused by quantization errors can be minimized.

In the above case, the arrangement does not aim at using all 256 gradation levels. However, a color masking apparatus (FIG. 33) using all 256 gradation levels can be realized by the following concept.

8- and 9-bit matrix point intervals are used in a mixed manner. When the mixture of the 8- and 9-bit intervals is used, an identification signal must be prepared to identify the boundary between the 8- and 9-bit intervals. The relationship between the output from the address signal generating means 40 and the format of the matrix points and the identification signal is set, as shown in FIG. 31.

The relationship between the output from the address signal generating means 40 and the output from the controller 50 is controlled when the input is level 216 as follows:

| Selection signal | 0 | 1 |
|---|---|---|
| Address signal to 24 | 6 | 3 |
| Address signal to 20 | 26 | 27 |
| Identification signal | 1 | 1 |

If the selection signal is set at logic "0", the value of the address signal to the weighting coefficient memory means 24 is a difference (=6) between the minimum matrix point 210 which is closest to the input 216. However, if the selection signal is set at logic "1", a difference (=3) between input 216 and the next matrix point 219 is selected.

The identification signal of logic "1" represents a matrix point of the 9-bit interval, and the identification signal of logic "0" represents a matrix point of the 8-bit interval. The identification signal is required due to the following reason.

When the matrix point interval varies, the space region defined by the three color matrix points is not given as a cube but as a rectangular prism, and all combinations of its volume are considered as follows:

$512 (=8 \times 8 \times 8)$ $576 (=8 \times 8 \times 9)$ $648 (=8 \times 9 \times 9)$ $729 (=9 \times 9 \times 9)$ Therefore, the identification signal is required to discriminate whether one side of the three-dimensional pattern is expressed by 8 or 9 bits.

In the weighting coefficient memory means 24, the weighting coefficients are set such that its total number is 256 on the basis of the identification signal.

For example, the image data values of each color are represented by the following coordinates:
(64,143,216)
and the weighting coefficients are given as shown in FIG. 32.

Final color correction data is obtained according to the above equations using the weighting coefficients and the color correction data.

If the bit intervals of the matrix points are appropriately selected, all the 256 gradation levels can be used. In this case, the controller 50 must generate the above-mentioned identification signal.

Figure 33:
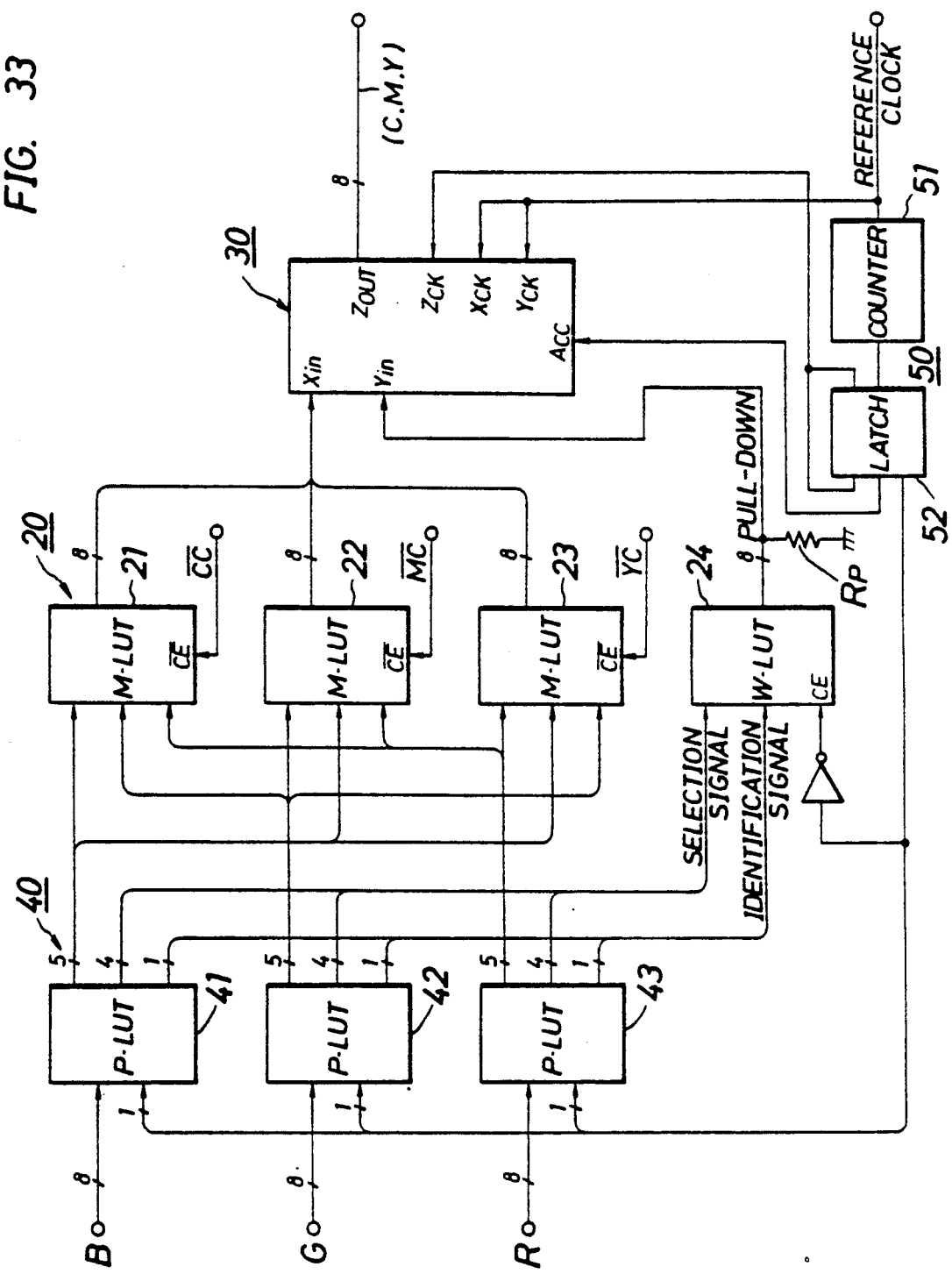
FIG. 33 is a block diagram showing still another embodiment of a color image correction apparatus according to the present invention.

FIG. 33 shows an arrangement of a color masking apparatus 1 in which all the 256 gradation levels are used. The same reference numerals as in FIG. 27 denote the same parts in FIG. 33, and a detailed description thereof will be omitted.

In this case, since the maximum matrix point interval is a 9-bit interval, a 4-bit address signal for the weighting coefficient corresponding to this distance is supplied from the address signal generating means (pre-LUT) 40 to the weighting coefficient memory means 24. The address signal generating means 40 generates an identification signal (1-bit signal) for discriminating the 8-bit interval from the 9-bit interval. The identification signal is supplied to the weighting coefficient memory means 24.

Control signals $\overline{CC}$, $\overline{MC}$, and $\overline{YC}$ are respectively supplied to chip enable terminals $\overline{CE}$ of the color correction data LUTs 21 to 23. The color correction data are sequentially read out from the LUTs 21 to 23, e.g., in the order named and are supplied to the multiplier/accumulator means 30.

The correction value outputs are sequentially processed by the multiplier/accumulator means 30.

The multiplier/accumulator means 30 comprises a single-chip IC including multipliers and adders. Upper 8-bit data as the sum output (sum of the products) of all color components are sequentially output.

The controller 50 comprises a divide by none counter 51 and a latch 52 for controlling an output timing. Reference clocks to the counter 51 are commonly supplied to input terminals Xck and Yck of the multiplier/accumulator 30. The color correction data $K_i$ and the weighting coefficient $A_i$ input to the X and Y terminals are processed at these clock timings. Clocks obtained by counting down the reference clocks to 1/9 are supplied to the Zck terminal such that the final color correction data is output from an output terminal ZOUT at the timing next to the timing for providing eight sums of products. If an arithmetic operation control pulse supplied to an accumulation terminal ACC is set at level "1", the following operation is performed:

$$X \cdot Y + Q$$

where Q is the immediately preceding sum output. The control pulse of level "0" is output every time the ninth reference clock is generated, thereby resetting the sum output and preparing the next color correction operation cycle.

In the reset state, a reset signal is supplied to the chip enable terminal $\overline{CE}$ of the memory means 24 such that a weighting coefficient of all 0s is input to a terminal Yin. As a result, the data from the terminal Yin is set at "0" by a pull-down resistor Rp and reset processing is performed as $X \cdot Y = 0$.

Modifications of this embodiment will be described below.

First, in the above embodiment, the final color correction data is calculated by the color correction data of the eight matrix points. However, the final color correction data may be interpolated by two color correction data at the diagonal vertices Interpolation is suitable when a large number of correction data as color correction data are used.

Second, in the above embodiment, the color correction data is stored in an LUT ROM. However, the color correction data memory means may comprise a RAM, and another memory (e.g., a ROM or a disk memory) may be prepared for storing the color correction data. The color correction data may be read out from the latter memory and may be written in the RAM in practical applications.

With the above arrangement, an S-RAM may be used as a RAM, and the processing time can be shortened.

As described above, in a system wherein an additional memory is used and the down-load operation is performed as needed, the additional memory may store special effect data such as color reversal data, data for selecting a desired color, data for changing the hue on the basis of types of illumination light, and color emphasis data. If these data are loaded in the RAM as needed, the special effects can be easily achieved.

Third, when the color masking apparatus is applied to printing, another LUT for storing black data is added to the color correction data memory means 20. In this case, a sequential processing color masking apparatus can be simply obtained as compared with a simultaneous processing apparatus.

Fourth, in the method of calculating the weighting coefficients, the volume of the rectangular prism need not be used as the weighting coefficient but the weighting coefficient may be obtained as an inverse number (or a power of n of the inverse number) of a distance from the point $P_i$.

Fifth, if a latch is connected between each component in the color correction data memory means 20 and the corresponding component in the multiplier/accumulator means 30, processing in each pair of components can be independently performed. Therefore, high-speed arithmetic processing can be achieved.

Sixth, the color data correction method and apparatus are applied to image processors such as a color proof apparatus, a video printer, or a digital color copying machine. However, it is apparent that the present invention can be applied to an arithmetic operation apparatus for performing color space coordinate conversion between (Y,M,C), (B,G,R), (L*,u*,v*), (L*,a*,b*), and (X,Y,Z).

Another color image correction method will be described when the target value T' is located outside the three-dimensional pattern.

The target value T' outside the color reproduction range of the output system need not be compressed to a color T* on the boundary plane of the color reproduction range of the output system but can be replaced with a target value plotted slightly inside the boundary plane.

Figure 34:
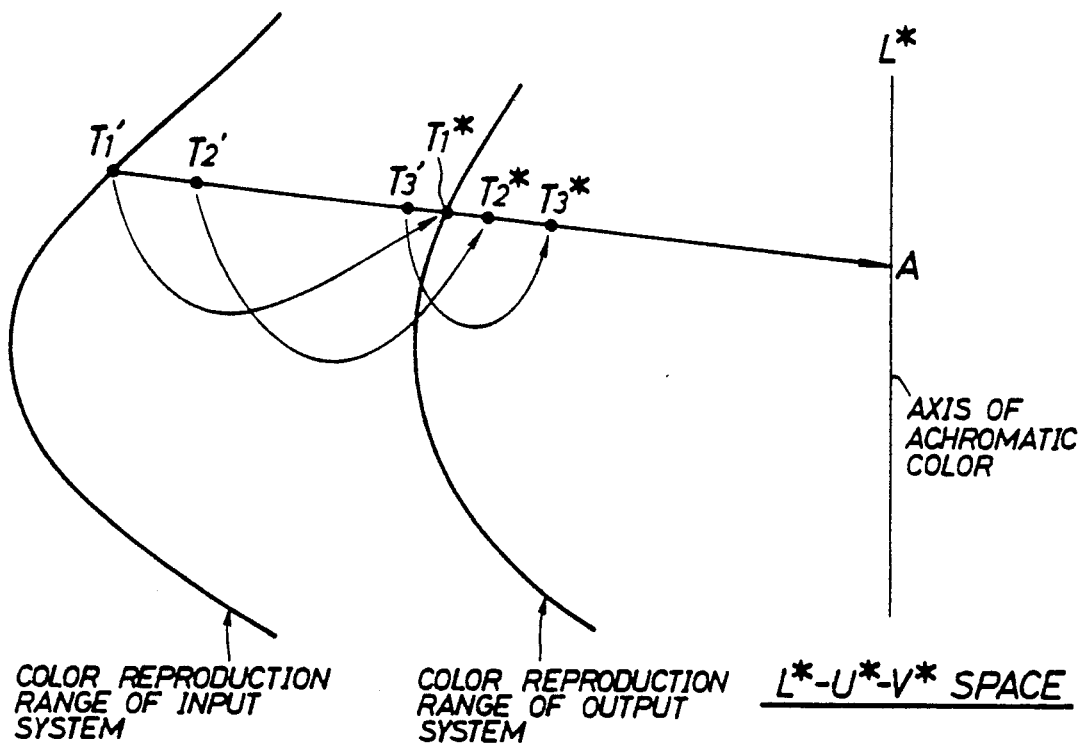
FIG. 34 is a diagram showing color reproduction ranges of the input and output systems.

In this case, the color T* on the boundary plane may be utilized and a desired target value (L*,u*,v*) plotted slightly inside the boundary plane by a predetermined amount is calculated on the basis of the color T* so as to establish a one-to-one correspondence between the desired target values and values in the Y-M-C coordinate system, as shown in FIG. 34.

In this case, a color T1' on the boundary plane of the color reproduction range of the input system is replaced with a color T1* on the boundary plane of the color reproduction range of the output system, and colors T2' and T3' plotted outside the color reproduction range of the output system and inside the color T1* are replaced with colors plotted inside the color reproduction range of the output system.

In addition, colors near the boundary plane within the color reproduction range of the output system can be replaced with colors inside the range (i.e., in the direction of the achromatic color).

Since T2* and T3* are calculated on the basis of the color on the boundary plane, the color (L*,u*,v*) on the boundary plane must be calculated.

Various calculation equations may be proposed. Of these equations, the following one is selected as follows:

$$dTi^* = dTi^* - \alpha(dT1' - dTi) \text{ for } i=2, 3$$

where dT1', dT2', dT3', dT1*, dT2*, and dT3* are distances from the A point (i.e., the point on the axis of the achromatic color), as shown in FIG. 34, and $\alpha$ is a positive number.

The positive value $\alpha$ is properly selected so as not to provide a negative dT1*. When the distance dT1* becomes negative, the hue is inverted.

With the above operation, all colors outside the color reproduction range of the output system are not shifted to the boundary plane, and color changes are smoothly performed. Therefore, color correction data for more natural colors can be produced.

According to the present invention as described above, a desired correction value of the point x to be obtained can be interpolated using a sufficient plurality of color correction data. Therefore, all conventional problems are ameliorated.

First, the correction value errors are large in conventional linear approximation and correction value omissions occur in conventional nonlinear approximation. However, according to the present invention, since the correction value is calculated by interpolation, and correction value omissions can be eliminated. Perfect color reproduction can be achieved at predetermined color correction data points ($32 \times 32 \times 32$ points in this embodiment). In addition, since other points can be calculated by interpolation, the correction value errors are minimized and better color reproduction can be achieved.

Second, the capacity of the color correction data memory means can be greatly reduced.

A conventional apparatus requires a capacity of about 50 Mbytes. However, with the above arrangement, the memory capacity can be greatly reduced as follows:

(256 Kbits × 3 colors)/8 bytes = 96 Kbytes

The color image correction method according to the present invention can be suitably applied to an image processor (e.g., a color proof apparatus, a video printer, or a digital color copying machine) or an arithmetic operation apparatus for performing color space coordinate conversion between (Y,M,C), (B,G,R), (L*,u*,v*), (L*,a*,b*), and (X,Y,Z).

Third, the color images including all combinations of the maximum and minimum values of the color image signals are formed as color patch images on a recording medium. The colors corresponding to the color patches are actually measured to form color conversion data of the color system.

The number of colors to be actually measured can be specified, and color measurements can be simplified.

The color patches used in actual measurement are formed in consideration of the human visual sense, the color conversion data having quality equal to those formed without consideration of the identification power of the eye can be obtained.

The color measurement time of the color patches can be greatly reduced without degrading the color measurement precision.

The present invention can be suitably applied to the color patch forming method used in the following color image correction apparatus. In the color image correction apparatus, when a plurality of basic colors for forming a color image are mixed to reproduce an intermediate color in a given color system, the value of the color system which is close to the intermediate color as a target set in the color system can be converged and calculated in a one-to-one correspondence with values in a coordinate system defined by the basic colors. Therefore, the coordinate system target value corresponding to the value of the color system which is the closest to the intermediate color serving as the target can be corrected as combinations of the basic colors for reproducing the intermediate color to be obtained.

The reproduction colors obtained by a plurality of combinations of the plurality of basic colors are output beforehand, and the color system values corresponding to these combinations are calculated. By using the calculated values of the color system, interpolation and arithmetic operations are performed to obtain combinations of the plurality of basic colors based on the values of the color system to be obtained.

According to the above method, the actually measured color data are gradually converged to obtain a final target value. The final target value serves as color correction data. Therefore, the correction value is very accurate and color reproduction with high precision can be achieved.

The color image correction method and apparatus can be suitably applied to recording of color image data on print paper or printing paper.

According to the present invention, when the plurality of color patches are used to calculate the values of the corresponding color system, the required number of color patches can be obtained without increasing the actual number of color patches. Therefore, the color measurement time using the practical apparatus can be greatly shortened.

When the number of color patches is increased, curve approximation using three or more matrix points are used to perform interpolation according to the present invention. Even in a color system as a deformed three-dimensional pattern, the points to be interpolated can be accurately calculated.

The precision in one-to-one correspondence between the values in the color system and the values in the Y-M-C coordinate system can be improved, and color reproducibility on the basis of the resultant color correction data can be greatly improved.

According to the color image correction method of the present invention, if the color reproduction range of the output system is narrower than that of the input system and color image data having a level exceeding the color reproduction range of the output system is input, the value of the corresponding output system is compressed in the direction of the achromatic color of the output color system. The resultant compressed values are corrected by the values of the output color system.

According to this method, the saturation and lightness or one of them is changed to calculate a substituted target value without changing the hue. Color correction data for more natural colors can be obtained. Therefore, even in this case, since the hue is not changed although the saturation and lightness are changed, natural colors can be reproduced.

According to the present invention, since the color correction data is obtained from the actually measured color data, the correction value is very accurate and color reproduction with high precision can be obtained.

The present invention is very suitable for recording color image data on the print or printing paper.

According to the present invention, when the plurality of basic colors forming a color image are mixed to reproduce the intermediate color of the given color system, the value of the color system which is close to the intermediate color as a target set in the color system is sequentially converged in the one-to-one correspondence with the value of the coordinate system defined by the basic colors. The coordinate system target value corresponding to the value of the color system which is the closest to the intermediate value as the target is corrected as combinations of basic colors for reproducing the intermediate color to be obtained.

According to this method, since the color correction data is obtained from the actually measured color data, the correction value is very accurate.

For this reason, color reproduction can be performed with high precision.

The present invention is suitable for recording color image data on the print or printing paper.

FIG. 37 shows a second embodiment in which the color image correction apparatus according to the present invention is applied to a color masking apparatus.

The color masking apparatus comprises a memory means for storing color correction data corresponding to upper bits excluding the least significant bit in each of three image data obtained by color-separating a color image, a readout means for reading out at least two color correction data from the memory means, and an arithmetic operation means for calculating an average value of the readout color correction data, wherein the arithmetic operation means calculates the color correction data corresponding to the input color image data.

Interpolation of this embodiment will be briefly described.

For illustrative convenience, 64 input gradation levels and 64 output gradation levels are used. In each color component, color correction data is used for every other level as follows:

0, 2, 4, 6, 8, 10, 12, ... 60, 62 so that color correction data are provided for 32 points in each color component.

Each color input data comprises 6-bit data. By using at least two color correction data including the input color data, the color correction data corresponding to the input color data is calculated. Therefore, the color correction data stored in the memory means is used for upper five bits of the 6-bit input color data.

Assume that an odd number "7" is given as input color data of a given color. In this case, color correction data corresponding to "6" as a value obtained by rounding off one lower bit of "7", and color correction data corresponding to "8" as a value obtained by rounding up one lower bit of "7" are read out, and an average value of the readout color correction data is calculated. The resultant color correction data is used as the one for input color data "7". If an even number "8" is input as input data of a given color, values obtained by rounding up and off one lower bit of "8" are "8". Therefore, color correction data corresponding to "8" is read out twice, and its average value is calculated.

Figure 36:
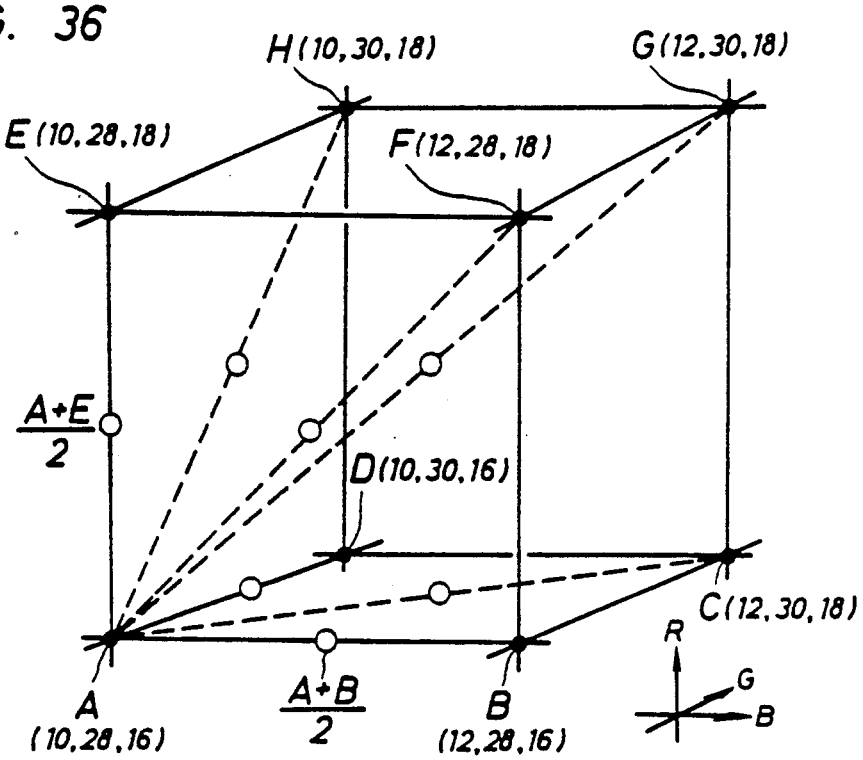
FIG. 36 is a view for explaining interpolation.

If three input color data are used, the operations are performed as shown in FIG. 36. FIG. 36 shows part of the three-dimensional pattern constituted by $32^3$. Matrix point A represents color correction data when the B, G, and R input color data are represented by coordinates (10,28,16).

Similarly, matrix points B to H representing the vertices of the three-dimensional pattern represent color correction data for the illustrated input color data.

Color correction data (b,g,r) to be interpolated is calculated in the following steps:
1. One lower bit of each of b, g, and r is rounded off;
2. One lower bit of each of b, g, and r is rounded up;
3. The color correction data obtained in step 1. is read out;
4. The color correction data obtained in step 2. is read out; and
5. An average value of the color correction data read out in steps 3. and 4. is calculated and used as color correction data.

More specifically, if the input color data b, g, and r are represented by coordinates (10,29,17), the following results can be obtained.

The result of step 1.: (10,28,16)
The result of step 2.: (10,30,18)
The result of step 3.: A
The result of step 4.: H
The result of step 5.: (A+H)/2

Data (A+H)/2 serves as the final color correction data.

Figure 35:
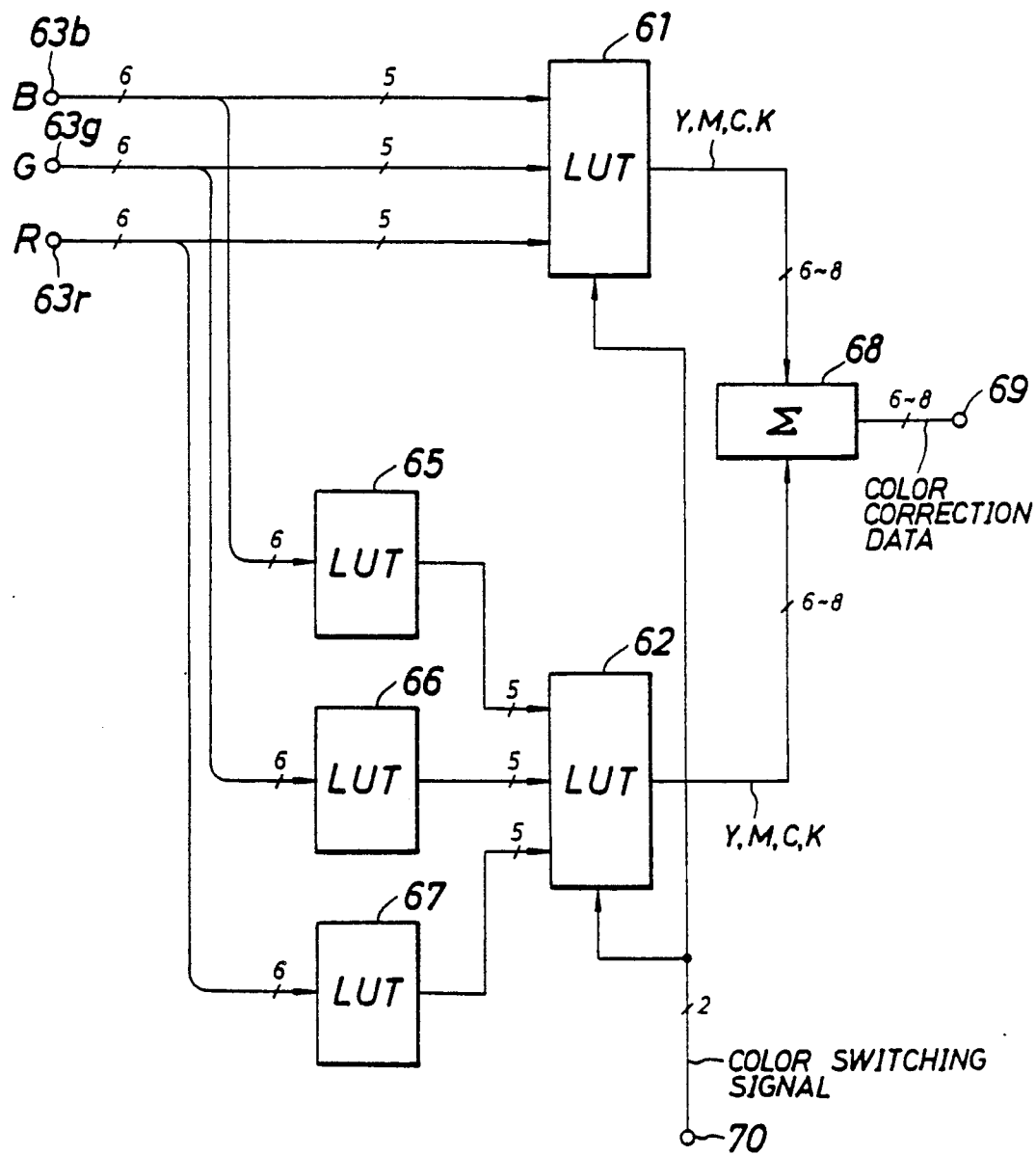
FIG. 35 is a block diagram showing the main part of still another embodiment of a color image correction apparatus.

FIG. 35 is an arrangement of a color image correction apparatus 60 for performing the above-mentioned interpolation.

In this arrangement, the color correction data subjected to rounding off and the color correction data subjected to rounding up are read out from memory means (LUTs), respectively.

For this purpose, a pair of LUTs 61 and 62 for storing identical color correction data are arranged. Each of the LUTs 61 and 62 stores color correction data corresponding to upper five bits of the input color data for every step for the input color data defined by 64 gradation levels.

In printing, color signals to be used are yellow Y, magenta M, cyan C, and black K. Therefore, four types of color correction data are stored. In this case, each LUT comprises a 1-Mbit ROM.

B, G, and R color data are input to terminals 63b, 63g, and 63r, respectively. Data of upper five bits are supplied to the first LUT 61 as address data, and the corresponding color correction data Y, M, C, and K are read out from the first LUT 61.

The input color data B, G, and R are also supplied to carry means 65 to 67, respectively. The carry means 65 to 67 comprise LUT ROMs or logic arrays. In this arrangement, LUTs are used. When the LUT is used, a bipolar PROM is suitable.

5-bit color data obtained by rounding up one lower bit are output from the carry means 65 to 67, respectively. However, if data "63" is input, the carry means perform rounding-off instead of rounding-up.

The carried input color data B, G, and R are supplied to the second LUT 62 as the address data. The color correction data Y, M, C, and K stored at the corresponding addresses are read out from the second LUT 62.

The color correction data Y, M, C, and K read out from the LUTs 61 and 62 are supplied to and averaged by an average value calculation means 68.

In this arrangement, the calculation means 68 comprises an adder. The sum output data is shifted by one bit, and upper-bit data (i.e., bit 6 to bit 8) is used as output data. The color correction data Y, M, C, and K which are equal to the averaged data appear at an output terminal 69.

Y, M, C, and K color switching signals (i.e., 2-bit address switching signals) are supplied to the LUTs 61 and 62 through a terminal 70. The Y, M, C, and K color correction data can be sequentially read out in response to the signals supplied to the terminal 70. The read mode may be a dot, line, or plane sequential read mode. In this embodiment, the color switching signals are supplied such that the Y, M, C, and K color correction data are read out in the plane sequential mode.

FIG. 37 shows still another embodiment of a color image correction apparatus according to the present invention.

In this embodiment, only color correction data stored in one LUT are utilized to perform the same operation as described above.

An LUT 71 is arranged to store color correction data corresponding to upper five bits of each of input color data B, G, and R. The LUT 71 is the same as that of the pair of LUTs 61 and 62.

The input color data B, G, and R supplied to terminals 63b, 63g, and 63r are supplied to bit updating means 72 to 74, respectively. Bit updating is performed in synchronism with pixel clocks CK supplied to a terminal 75.

In this embodiment, when the pixel clock is set at high level, the least significant bit of each input color data is rounded off, and the resultant upper five bits are output. However, when the pixel clock is set at low level, the least significant bit of each input color data is rounded up, and the resultant five bits are read out.

The bit updating means 72 to 74 may be LUTs obtained by formatting the rounded-up and rounded-off color data into tables, or may comprise logic arrays. In this embodiment, the bit updating means 72 to 74 comprise LUTs.

The input color data of upper five bits is supplied to the LUT 71 as address data. If the first input color data is obtained by rounding off the data by one bit, the corresponding color correction data are read out and latched by a latch 76. The pixel clock CK is supplied to the latch 76 such that latching is performed in response to the pixel clock of high level.

When the input color data is obtained by rounding up the data by one bit, the corresponding color data are read out. These color correction data are added to the latched color correction data by an adder 68. A sum output obtained by bit-shifting the sum data serves as the final interpolated color correction data as described above.

Rounding-up and rounding-off of the input color data are alternately and time-divisionally performed, and the color correction data are read out from the LUT on the basis of the processed color data. Therefore, only one color correction data memory as the LUT is required.

In the above embodiment, the color correction data of the pair of matrix points are interpolated. However, an average value may be obtained by using four or eight central matrix points on the surface of the three-dimensional pattern or four or eight color correction data at the center of the rectangular prism.

According to the arrangement of the present invention as described above, at least two preceding and succeeding color correction data including the input color image data are read out, and the two readout color correction data are averaged. The average data is used as the color correction data of the input color image data.

The color correction data accessed in response to the input color image data are formatted into a table, and averaging can be performed by simple additions by means of a given circuit arrangement.

According to this embodiment, a multiplier need not be used, and the circuit arrangement can be simplified.

With the above arrangement, the apparent number of color correction data is increased by interpolation, and the capacity of the memory can be greatly reduced.

For example, if all color correction data for 64 gradation levels are used, the memory capacity must be $64^3 \times 3$ in the conventional arrangement.

According to the present invention, however, the color correction data can be used for every other step or level, and the memory capacity can be reduced to $32^3 \times 3$. When only one LUT shown in FIG. 37 is used, the memory capacity can be reduced to $\frac{1}{8}$. When two LUTs are used as shown in FIG. 35, the memory capacity can be reduced to $\frac{1}{4}$.

The color image correction apparatus according to the present invention can be suitably applied to the above-mentioned color masking apparatus.

FIGS. 38 to 41 are views for explaining the principle of still another embodiment of a color image correction method according to the present invention.

If a color is vividly observed, the saturation C is represented by the following equation according to colorimetrics:

$$C = L^* \sqrt{(u - u_0)^2 + (v + v_0)^2}$$

for $L^* = 116 (Y/Y_0)^{\frac{1}{3}} - 116$ where
Y: the brightness of the input system
u,v: the coordinates in a chromaticity diagram of the input system when lightness is neglected
$Y_0$: the brightness of the output system
$u_0, v_0$ the coordinates in a chromaticity diagram of a reference white surface of the output system The brightness $Y_0$ is set to be slightly lower than that of the reference white surface and is actually set to be a value smaller than the reference brightness ($=100$).

It should be noted that the term of lightness $L^*$ is multiplied in the above equation in order to calculate the saturation C. By lowering the level of the reference white surface, the brightness $Y_0$ is set to be lower by the decrease in brightness of the reference white surface, and the lightness $L^*$ is increased accordingly. As a result, the saturation C is increased.

The lightness $L^*$ in the $L^*$-$u^*$-$v^*$ color system is represented by the above equation. The hue $u^*$ and the saturation $v^*$ are represented by the following equations:

$$u^* = L^*(u - u_0)$$

$$v^* = L^*(v - v_0)$$

When the above principle is used in a practical application, the lightness and the saturation which cannot be normally expressed can be reproduced.

The practical applications will be exemplified as follows.

(Application 1)

Figure 38:
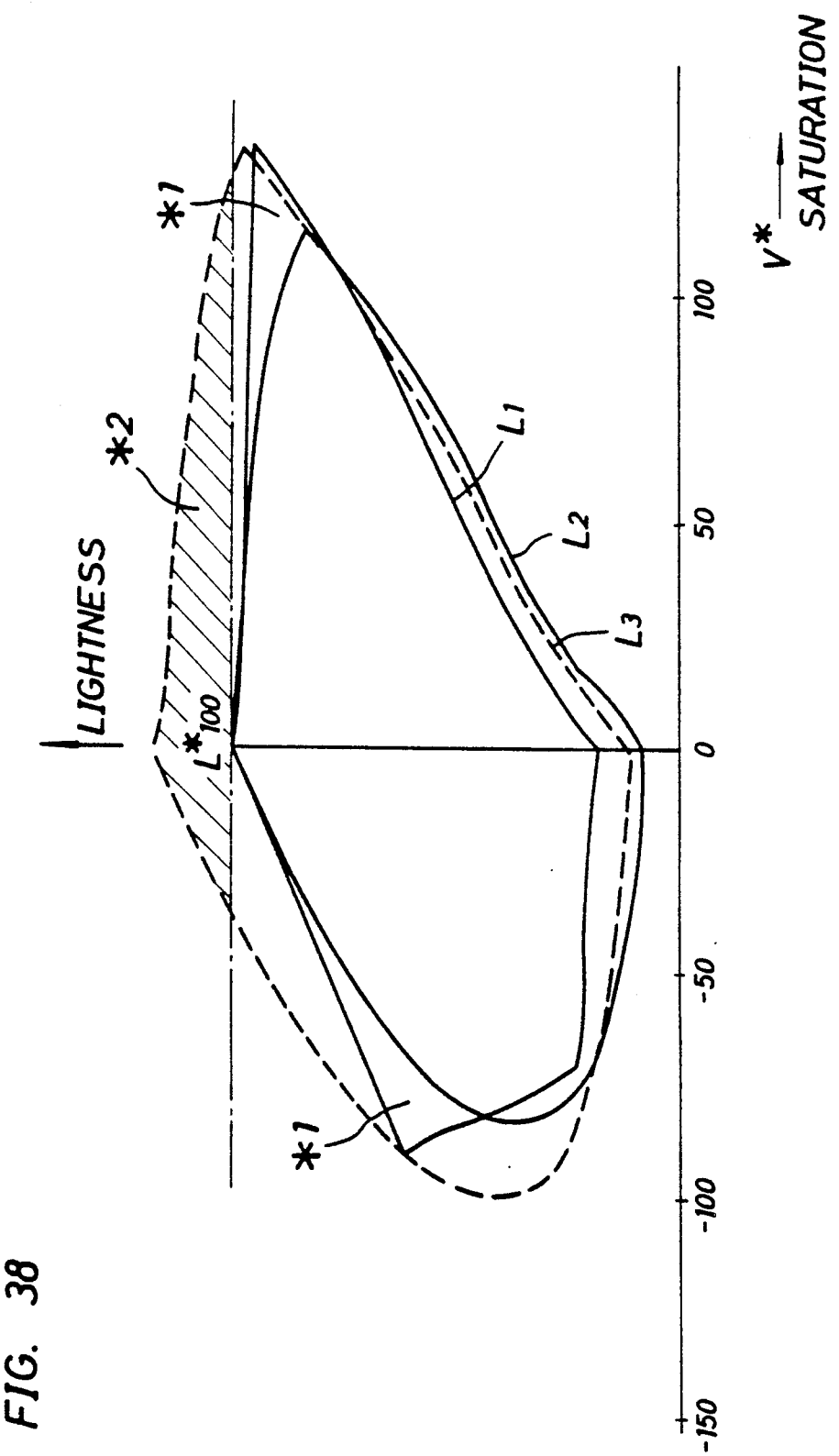
FIGS. 38 to 41 are views showing color reproduction ranges of the input and output systems in a color image correction method according to the present invention.

Print paper is used as a recording medium to record colors of a printed product (FIG. 38).

FIG. 38 is a view showing the relationship between the saturation and the lightness. A curve $L_1$ represents the range obtained by projecting the color reproduction range of a printed product on a plane constituted by the lightness and the saturation. A curve $L_2$ represents the color reproduction range when the white background of the print paper serves as a reference white surface.

As is apparent from comparison between these curves, a portion (*1) having high lightness and saturation levels represents a state wherein the color reproduction range of the printed product is wider than that of print paper. In this case, colors cannot be reproduced on print paper.

In this embodiment, brightness of the reference white surface of the print paper is set to be lower than that of the original reference white surface. In other words, (Reference White Surface)=(Reference White Surface)+D where D is the density. The color reproduction range at a density of about 0.15 is calculated, as indicated by a curve $L_3$ in FIG. 38.

According to the curve $L_3$, the lightness exceeds 100. However, an area *2 represented by hatched lines is not used in principle.

The apparent color reproduction range of the print paper can be widened, and most of the color reproduction ranges of the printed products can be included. After such level matching is performed, colors $L^*$, $u^*$, and $v^*$ to be printed are mapped to Y, M, and C of the print paper, thereby obtaining final color image correction values.

Figure 39:
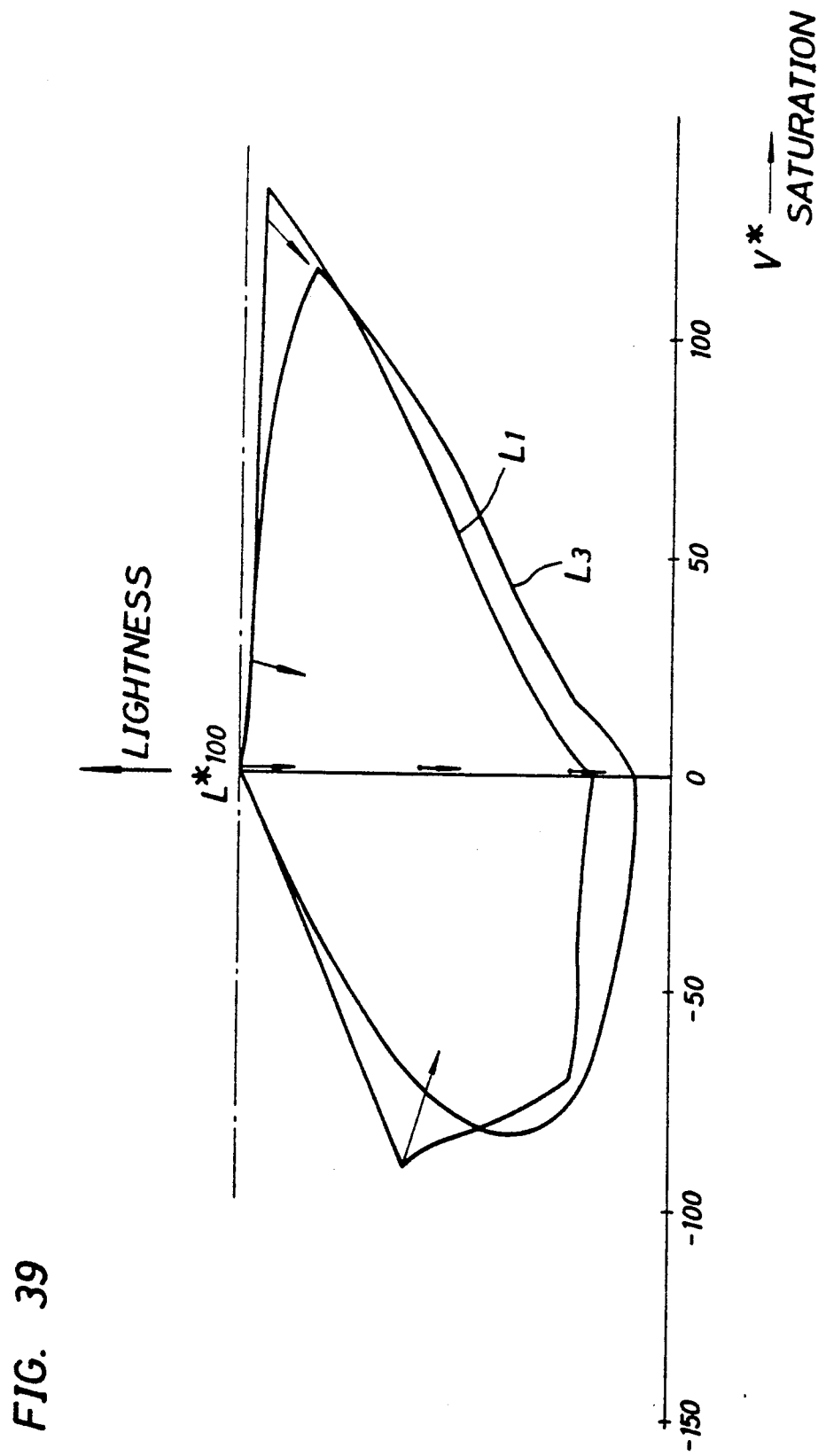

Mapping from the $L^*$-$u^*$-$v^*$ system to the Y-M-C system is color shifting indicated by arrows in FIG. 39. White of the printed product is white having a slightly excessive density (i.e., light grey).

Processing in Application 1 can be applied when a color CRT is used as an input system and print paper is used as the output system.

When a system for providing higher lightness and saturation levels in the white background, as in a printed product or a color CRT, is used for print paper, that is, when a color image is reproduced by a color proof apparatus or a color copying machine, the above means can be effectively used.

When there is a white background edge excluded from the image area of a hard copy output by the above means, this edge can be omitted or appropriately masked with black or grey. The white background is then concealed and a better effect can be obtained.

When the density D for changing the brightness of the reference white surface is excessively increased, the reproduced color becomes unnatural. The density D preferably falls within the range of:

$$D \leq 0.3$$

However, when a transparent original such as a slide is used, the restriction of the density need not be considered.

(Application 2)

A printed product is reproduced (i.e., displayed) on a color CRT.

Figure 40:
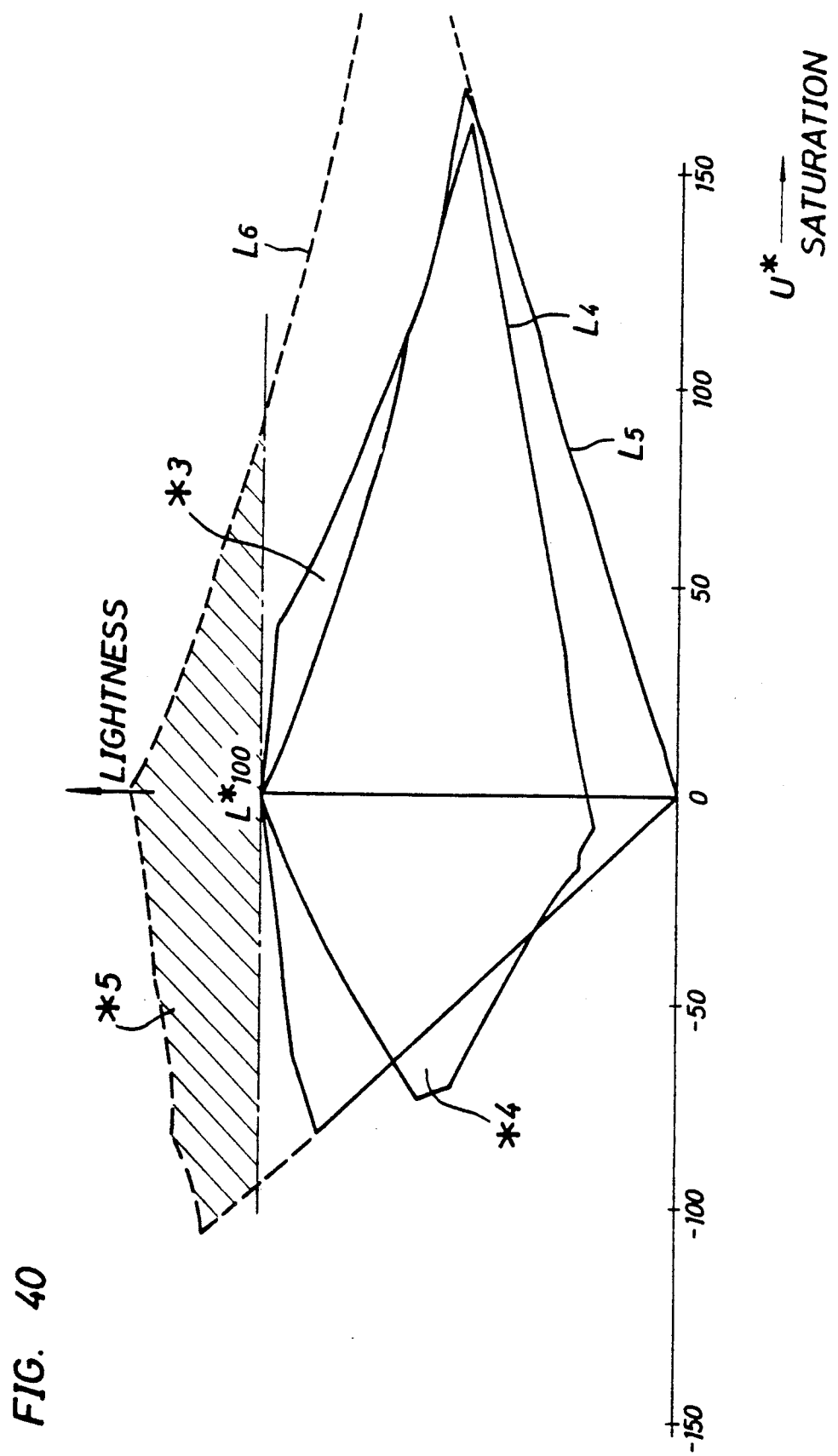

A curve $L_4$ in FIG. 40 represents the range in which the color reproduction range of the printed product is projected on a plane defined by the lightness and the saturation.

To the contrary, a curve $L_5$ represents the color reproduction range when the brightest white portion or the color CRT is defined as the reference white surface.

As is apparent from these ranges, a portion (*3) having high lightness and saturation levels of the printed product and a portion (*4) having a high saturation level and a low lightness level of the printed product have a wider color reproduction range than those of the color CRT.

The brightness of the reference white surface is set to be ½ the luminance of the brightest white portion on the color CRT, and the color reproduction range of the color CRT can be calculated as indicated by a curve $L_6$. The lightness in an area *5 represented by the hatched lines falls within the range of $L^* > 100$. However, this area is not used in principle.

When the condition is given as indicated by the curve $L_6$, the color reproduction range for the high lightness and saturation levels is increased to cover most of all color reproduction ranges of the printed products.

After such level matching is performed, colors $L^*$, $u^*$, and $v^*$ of the printed product are mapped into B, G, and R on the color CRT, thereby calculating the corrected color image.

Figure 41:
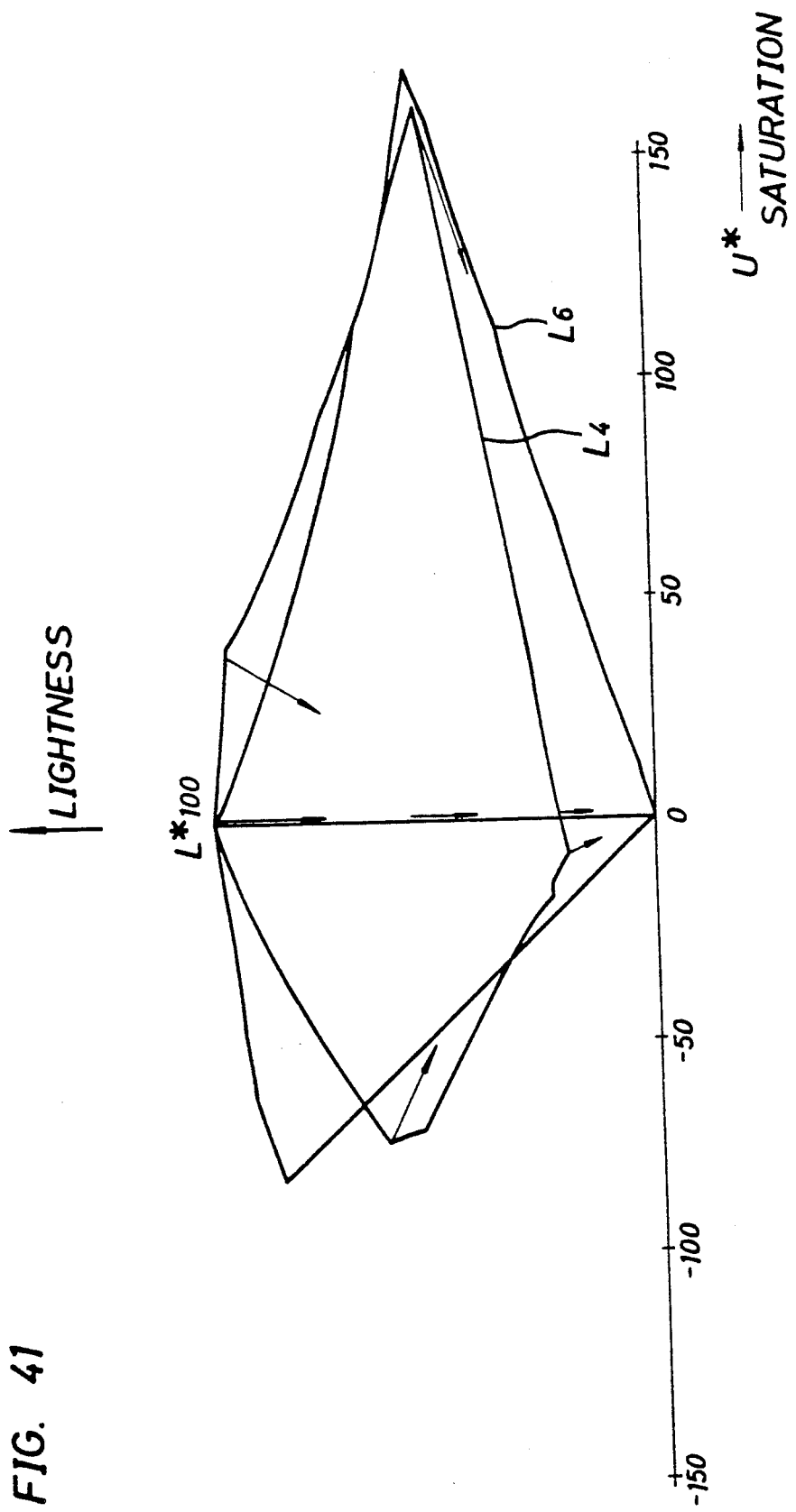

Mapping from the printed product to the color CRT accompanies color shifting indicated by arrows in FIG. 41.

In the system in which the reference white surface level is changed, the lightness and the saturation or one of them for the area *4 is preferably changed for mapping. A case wherein both the lightness and the saturation are changed is shown in FIGS. 23 to 25.

The means shown as Application 2 is suitable for a system for monitoring colors of the printed product or the color CRT.

In this case, unlike Application 1, the reference white surface may have a slightly lower brightness level if the atmosphere for observing the color CRT is dark. It is essential to set the reference white surface at a minimum level for reproducing the input system. However, in practice, the minimum level is the luminance level obtained by decreasing the normal luminance level to about ½.

The basic principle of the color image correction method required for mapping to the print paper or the color CRT is the same as described above.

What is claimed is:

1. A color correction method comprising:
   providing a plurality of color patch images on a recording medium, each of said color patch images having a predetermined ratio of basic colors;
   generating basic color data, including measuring each of said color patch images;
   converting said basic color data into data in a distinctive color system, including storing said color system data, each of said stored color system data having a color system address corresponding to said predetermined ratio of said basic colors; and
   interpolating said color system data with a plurality of assumed points which are not directly corresponding to any of said color system data, wherein each of said assumed points has an assumed address which is determined in accordance with stored weighting data to provide said assumed address between a pair of color system addressed which are nearest to said assumed address, including determining an interpolated color value by interpolating between the color system data at said pair of color system addresses according to the weighting data that provided said assumed address.

2. The color correction method of claim 1, in which the converting step converts the basic color data into data in the so-called L, u, V color system, where the general rules are represented by $L^*$, $u^*$, and $V^*$, and the specific components converted to be stored are $Li^*$, $ui$, and $Vi^*$, where i varies from 1 to 4;

and the interpolating steps includes interpolating according to the following equations:

$$L_m^* = -(1/16)L_1^* + (9/16)L_2^* + (9/16)L_3^* - (1/16)L_4^*$$

$$u_m^* = -(1/16)u_1^* + (9/16)u_2^* + (9/16)u_3^* - (1/16)u_4^*$$

$$v_m^* = -(1/16)v_1^* + (9/16)v_2^* + (9/16)v_3^* - (1/16)v_4^*$$

for two known addresses before and two known addresses after each assumed point, or alternatively, with three known addresses before and one known address after each assumed point, the following equations:

$$L_m^* = (5/16)L_1^* + (15/16)L_2^* - (5/16)L_3^* - (1/16)L_4^*$$

$$u_m^* = (5/16)u_1^* + (15/16)u_2^* - (5/16)u_3^* - (1/16)u_4^*$$

$$v_m^* = *5/16)v_1^* + (15/16)v_2^* - (5/16)v_3^* - (1/16)v_4^*.$$

* * * * *

UNITED STATES PATENT AND TRADEMARK OFFICE
CERTIFICATE OF CORRECTION

PATENT NO. : 5,065,234
DATED : November 12, 1991
INVENTOR(S) : Po-chieh HUNG et al.

It is certified that error appears in the above-identified patent and that said Letters Patent is hereby corrected as shown below:

Claim 1, column 32, line 22, change "addressed" to --addresses--.

Claim 2, column 32, line 33, change "ui" to --ui*--.

Claim 2, column 32, line 56, change "*5/16)" to --(5/16)--.

Signed and Sealed this

First Day of June, 1993

Attest:

MICHAEL K. KIRK

*Attesting Officer*        *Acting Commissioner of Patents and Trademarks*